US011304259B2

(12) United States Patent
More et al.

(10) Patent No.: US 11,304,259 B2
(45) Date of Patent: Apr. 12, 2022

(54) EFFICIENT MULTICAST COMMUNICATION SUITABLE FOR USE IN LOCAL PRIVATE 3GPP NETWORKS

(71) Applicant: Cisco Technology, Inc., San Jose, CA (US)

(72) Inventors: Ajaykumar Gopalprasad More, San Jose, CA (US); Shailender Potharaju, Fremont, CA (US); Mahesh Satyanarayana, Santa Clara, CA (US); Vicky Sachdeva, San Jose, CA (US); Nitin Prakash Sharma, Fremont, CA (US); Rajesh S. Pazhyannur, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 109 days.

(21) Appl. No.: 16/692,597

(22) Filed: Nov. 22, 2019

(65) Prior Publication Data
US 2021/0160954 A1 May 27, 2021

(51) Int. Cl.
*H04W 76/40* (2018.01)
*H04W 16/14* (2009.01)
(Continued)

(52) U.S. Cl.
CPC .............. *H04W 76/40* (2018.02); *H04W 4/06* (2013.01); *H04W 16/14* (2013.01); *H04W 84/105* (2013.01)

(58) Field of Classification Search
CPC ....... H04W 76/40; H04W 4/06; H04W 16/14; H04W 84/105
See application file for complete search history.

(56) References Cited

U.S. PATENT DOCUMENTS 7,756,069 B2 7/2010 Iino
8,320,290 B2 11/2012 Chao et al.
(Continued)

OTHER PUBLICATIONS

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 16)", 3GPP TS 29.274 V16.0.0 (Jun. 2019), 396 pages.
(Continued)

*Primary Examiner* — Sharmin Chowdhury
(74) *Attorney, Agent, or Firm* — Edell, Shapiro & Finnan, LLC

(57) ABSTRACT

A radio access network (RAN) entity (e.g. an eNodeB) may be configured to facilitate multicast communication in a local private Third Generation Partnership Project (3GPP) network. The RAN entity may receive a user data packet tunneled in an IP message via one of a plurality of downlink tunnels. The RAN entity may select, from a plurality of stored mappings, one of a plurality of multicast group identifiers that is mapped to an identified one of a plurality of downlink tunnel endpoint identifiers that matches a downlink tunnel endpoint identifier from a tunnel header of the IP message, as well as one of a plurality of sets of UE identifiers that is mapped to the selected multicast group identifier. The RAN may send, for each one of the UE identifiers in the selected set of UE identifiers, the user data packet for transmission to a UE associated with the UE identifier.

14 Claims, 17 Drawing Sheets

(51) Int. Cl.
*H04W 4/06* (2009.01)
*H04W 84/10* (2009.01)

(56) References Cited

U.S. PATENT DOCUMENTS

| | | | |
|---|---|---|---|
| 8,514,756 B1* | 8/2013 | Ramachandra | H04L 61/2069 |
| | | | 370/310 |
| 8,909,223 B2 | 12/2014 | Abhishek et al. | |
| 9,456,315 B2 | 9/2016 | Lohmar et al. | |
| 9,693,205 B2 | 7/2017 | Vaidya et al. | |
| 10,225,698 B2 | 3/2019 | Vaidya et al. | |
| 2009/0147718 A1 | 6/2009 | Liu et al. | |
| 2012/0134311 A1 | 5/2012 | Zhai et al. | |
| 2013/0058338 A1 | 3/2013 | Guttman et al. | |
| 2013/0128889 A1 | 5/2013 | Mathur et al. | |
| 2016/0007316 A1* | 1/2016 | Vaidya | H04W 64/003 |
| | | | 370/312 |
| 2016/0072634 A1 | 3/2016 | Khan et al. | |
| 2017/0339046 A1 | 11/2017 | Gast et al. | |
| 2020/0015194 A1* | 1/2020 | Li | H04W 52/0235 |

OTHER PUBLICATIONS

Wireless Watch, "LTE-Broadcast has broad deployment models. What it doesn't have is the iPhone", Jan. 18, 2017, 7 pages, downloaded from Internet Aug. 13, 2019; https://www.theregister.co.uk/2017/01/18/lte_broadcast_no_iphone/.

* cited by examiner

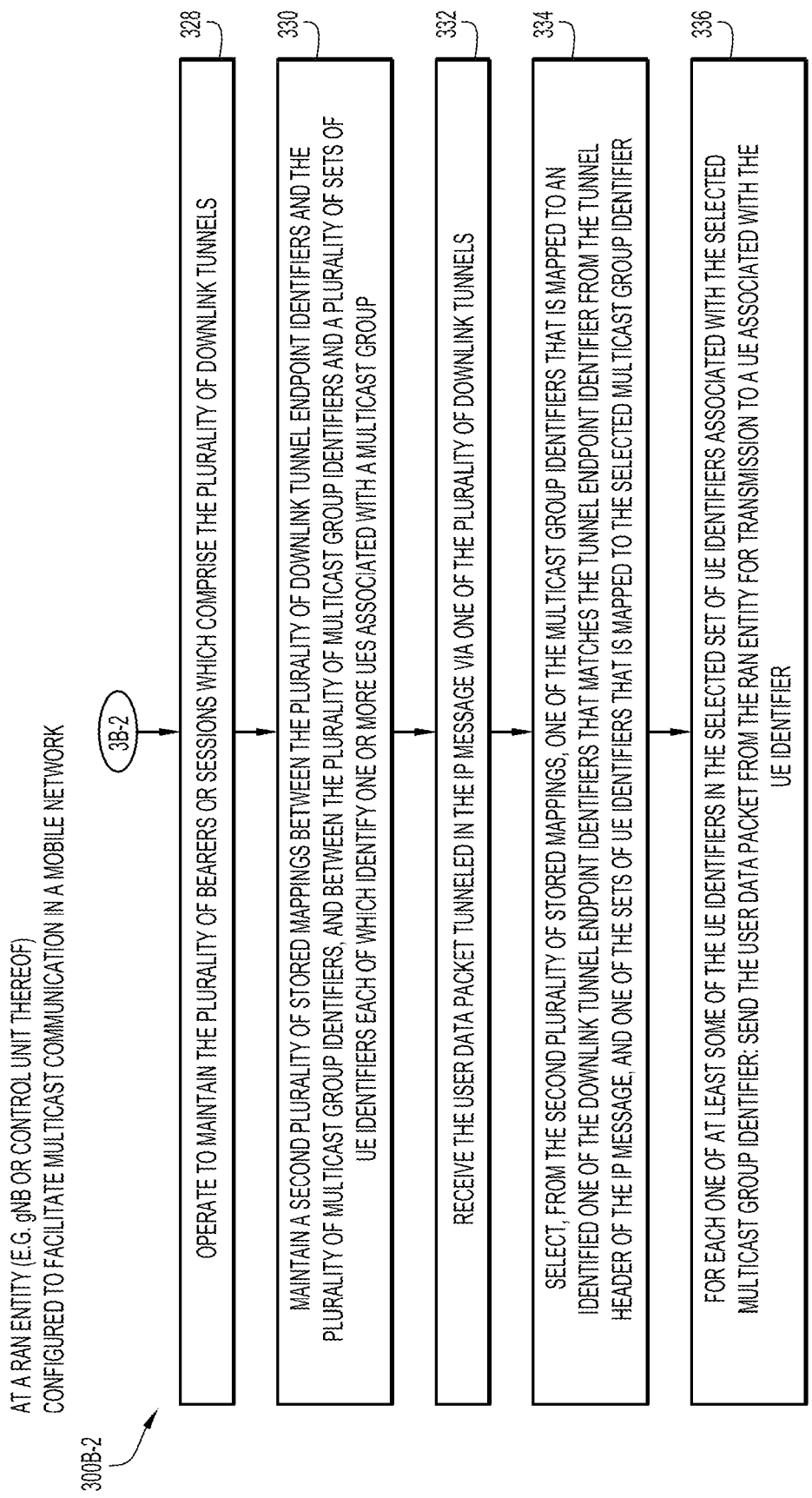

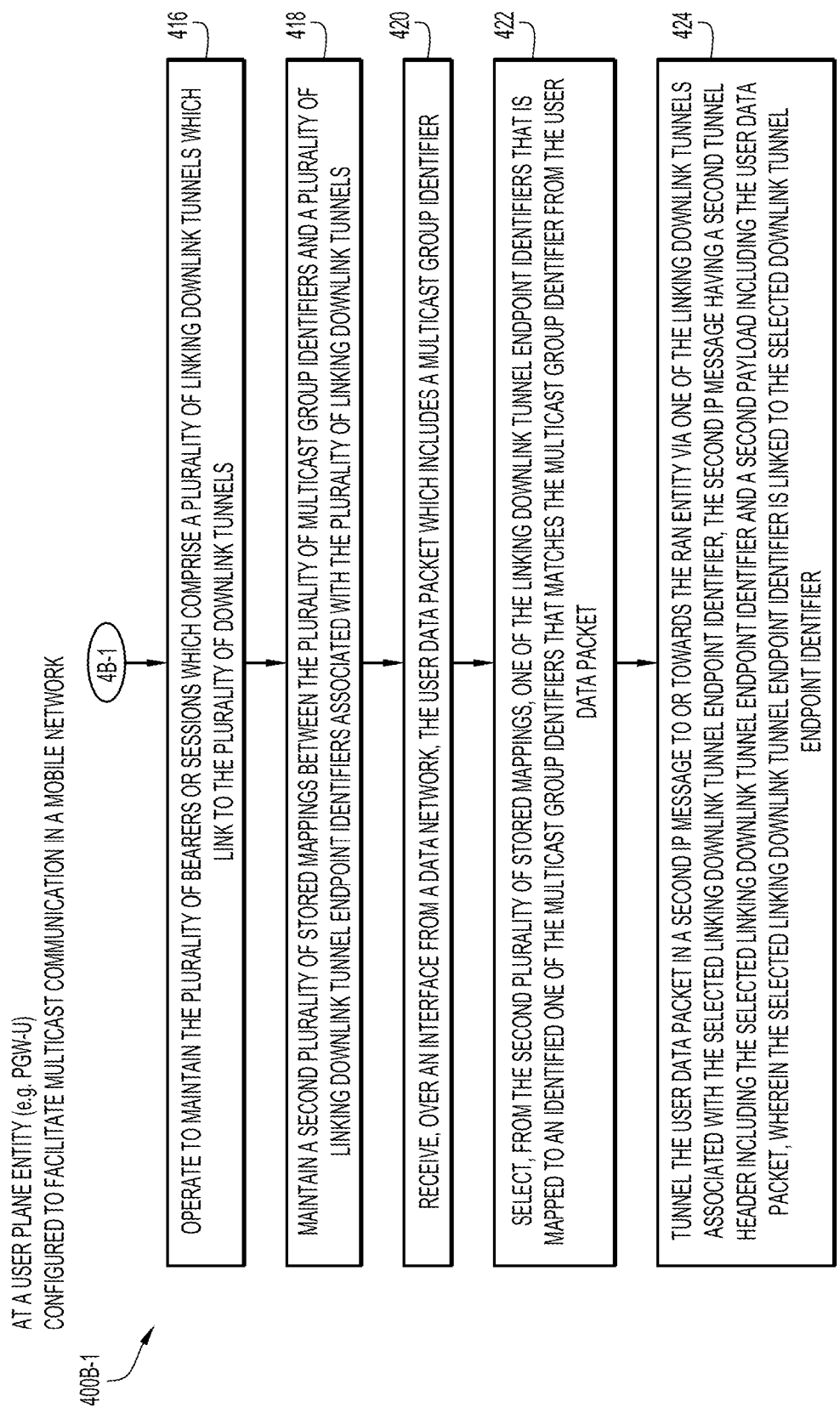

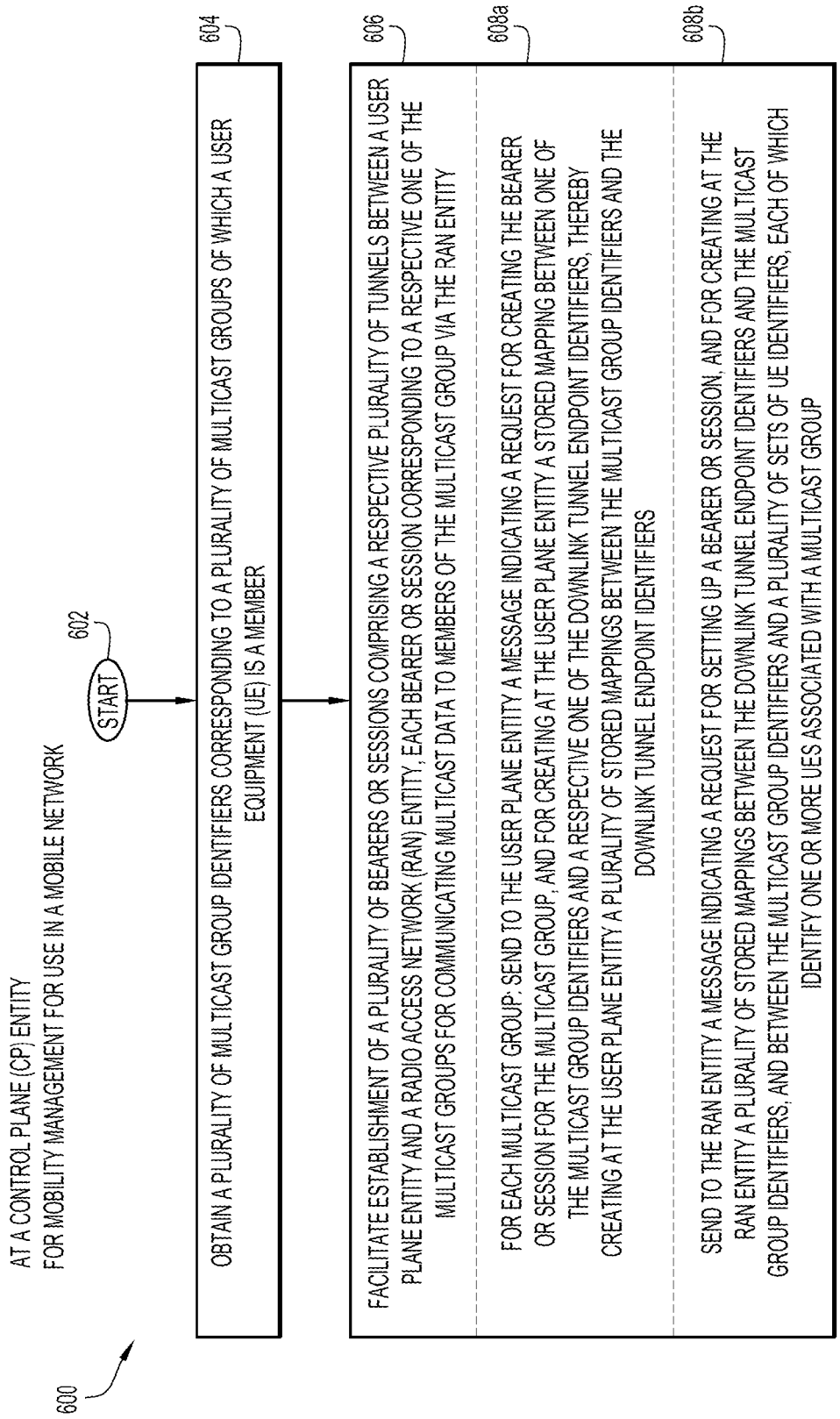

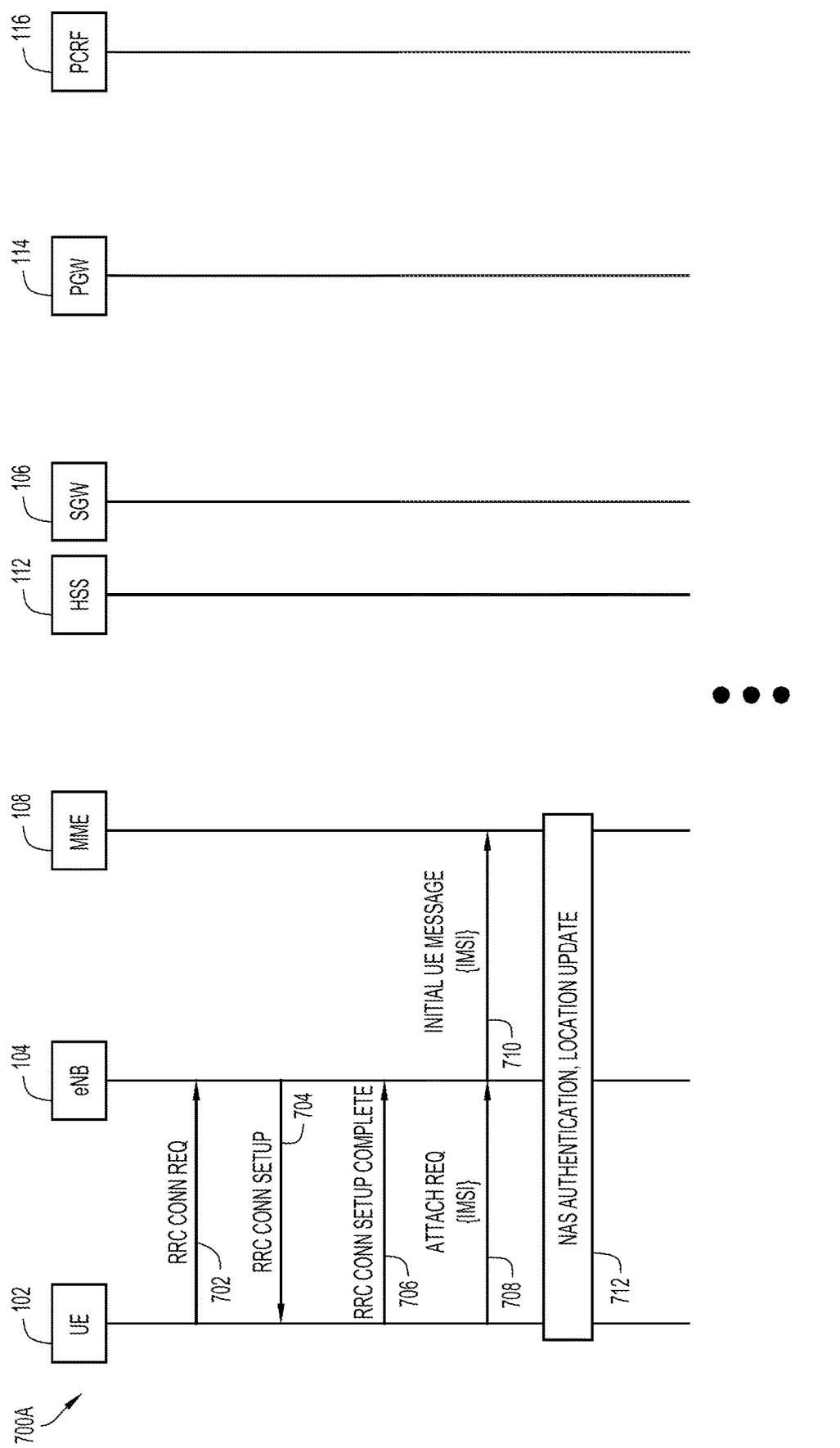

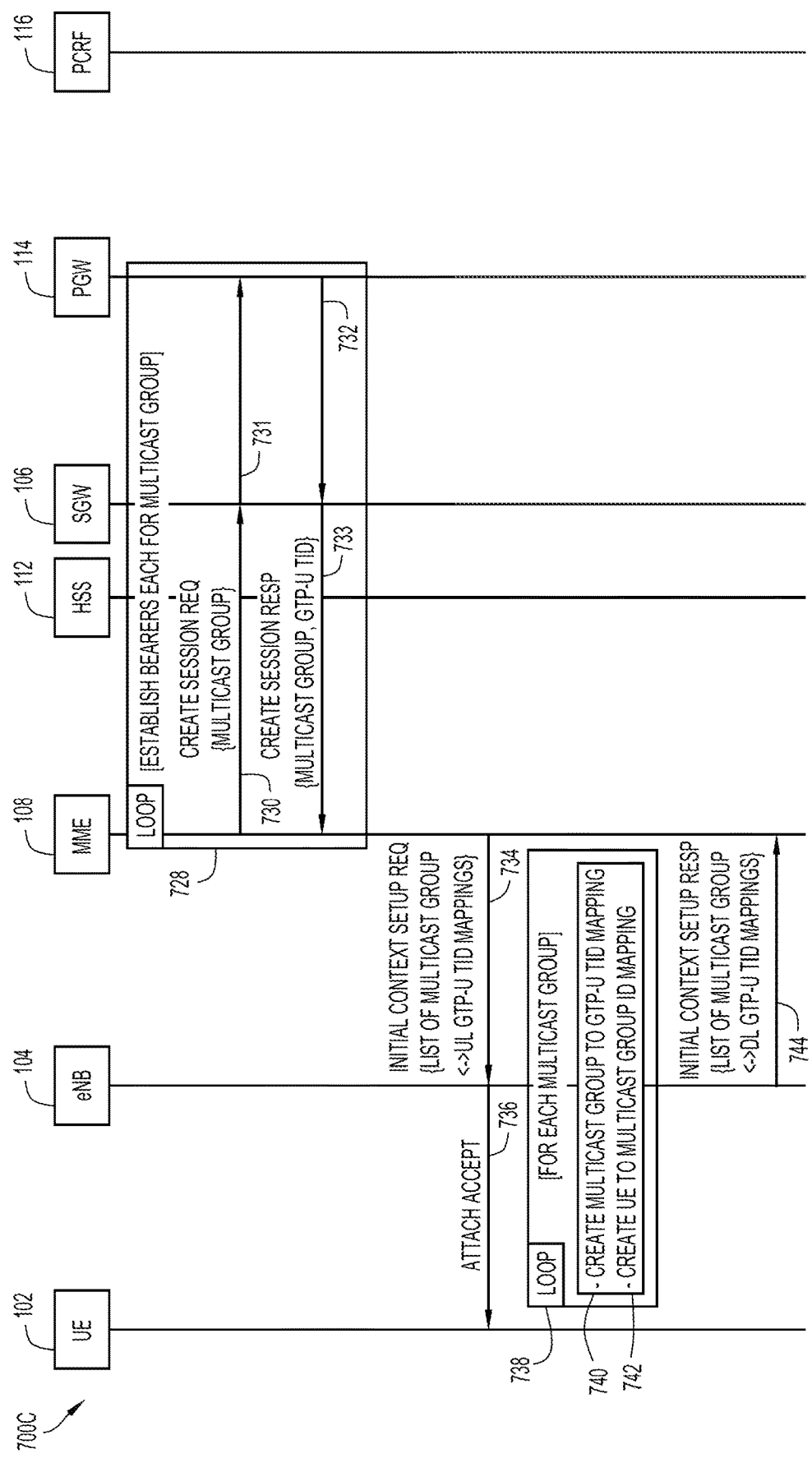

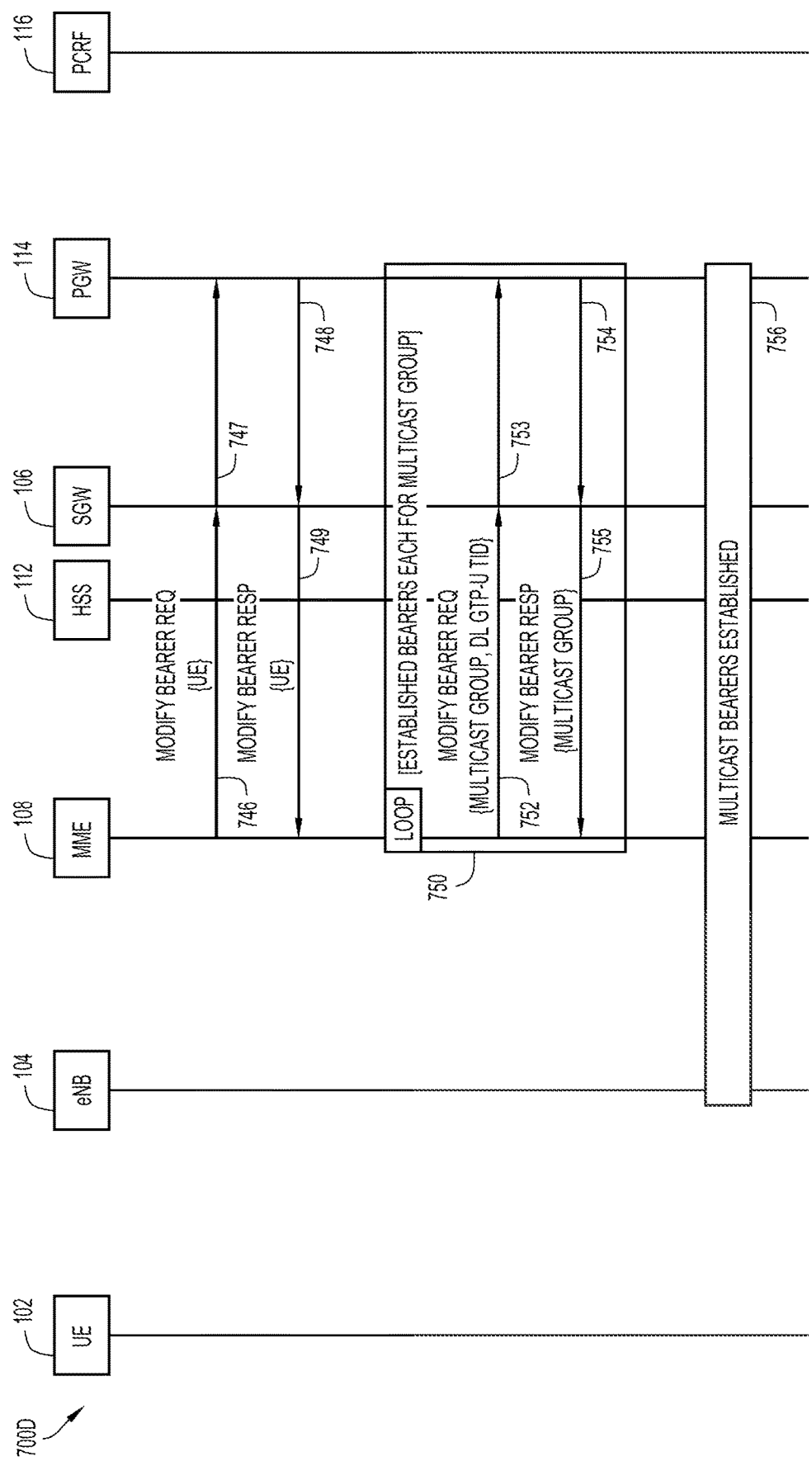

US 11,304,259 B2

EFFICIENT MULTICAST COMMUNICATION SUITABLE FOR USE IN LOCAL PRIVATE 3GPP NETWORKS

TECHNICAL FIELD

The present disclosure relates generally to telecommunications systems, and more particularly to multicast communication for user equipments (UEs) in a Third Generation Partnership Project (3GPP) network such as a local private 3GPP network.

BACKGROUND

Implementing multicast and broadcast communication for user equipments (UEs) operating in Long-Term Evolution (LTE) based mobile networks has not been without issues. One solution for multicast/broadcast in these environments makes use of an evolved Multimedia Broadcast Multicast Service (eMBMS). Using eMBMS, an eNodeB streams downlink multicast traffic to UEs over a dedicated multicast channel, referred to as a Physical Multicast Channel (PMCH).

With eMBMS, however, operators need to deploy new functions, such as an eMBMS gateway (eMBMSGW) and an MBMS Coordination Entity (MCE), in an LTE core. Also, there is no widespread support for eMBMS in LTE-configured UEs. These issues are more prominent in enterprise private LTE networks utilizing Citizens Broadband Radio Service (CBRS), where the LTE core (typically co-located in a data center of an enterprise) tends to be of a lower complexity compared to that of service providers.

BRIEF DESCRIPTION OF THE DRAWINGS

FIGS. 3B-1 and 3B-2 are flowcharts for describing methods for use in facilitating multicast communication for UEs in the 3GPP network according to some implementations of the present disclosure, which may be performed by a radio access network (RAN) entity (e.g. an eNodeB or gNodeB) with the user plane entity as described in relation to FIG. 3A;

FIGS. 4B-1 and 4B-2 are flowcharts for describing methods for use in facilitating multicast communication for UEs in the 3GPP network according to some implementations of the present disclosure, which may be performed by the user plane entity with the RAN entity (e.g. an eNodeB or gNodeB) as described in relation to FIG. 4A;

FIG. 6 is a flowchart for describing a method for use in establishing a plurality of bearers or sessions associated with a plurality of multicast groups of a UE, for facilitating multicast communication for UEs in a 3GPP network according to some implementations of the present disclosure, which may be performed by a control plane entity for mobility management of the 3GPP network;

FIGS. 7A-7D are call flow diagrams for describing a method for use in establishing a plurality of bearers or sessions associated with a plurality of multicast groups of a UE, for facilitating multicast communication for UEs in a 3GPP network according to some implementations of the present disclosure;

DESCRIPTION OF EXAMPLE EMBODIMENTS

Figure 1:
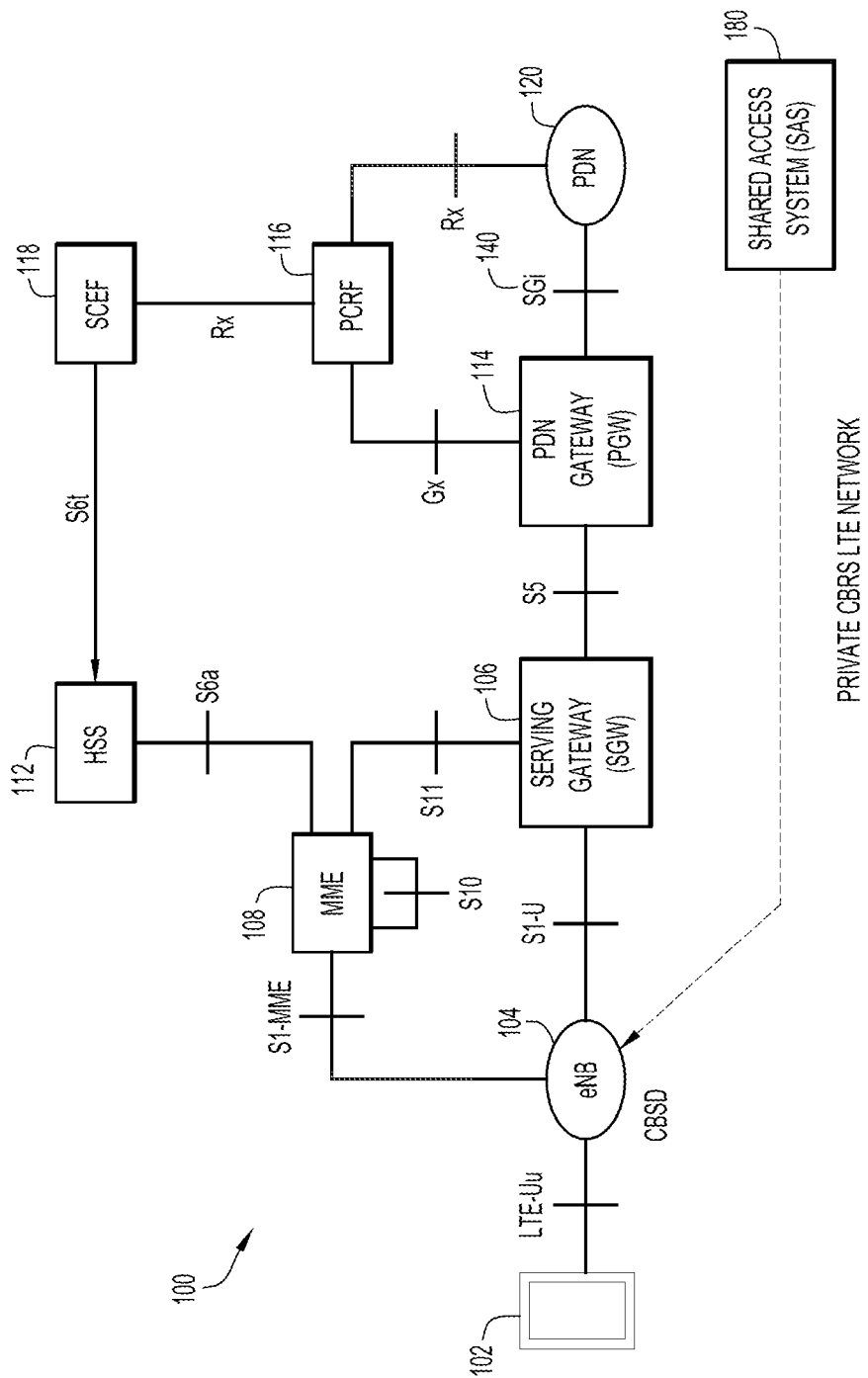
FIG. 1 is an illustrative representation of a network architecture of a Third Generation Partnership Project (3GPP) network which, in this example, is a local private Long-Term Evolution (LTE) based mobile network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for use in efficient multicast communication to user equipments (UEs) in Third Generation Partnership Project (3GPP) networks are described herein. The techniques and mechanisms of the present disclosure may be suitable for use in local private 3GPP networks, such as local private Citizens Broadband Radio Service (CBRS) Long-Term Evolution (LTE) based networks or Fifth Generation (5G) networks, in enterprise environments.

In one illustrative example, a radio access network (RAN) entity may be configured to facilitate multicast communication for UEs in a 3GPP network. The RAN entity (e.g. an eNodeB or gNodeB) may receive a user data packet tunneled in an IP message via one of a plurality of downlink tunnels. The RAN entity may select, from a plurality of stored mappings, one of a plurality of multicast group identifiers that is mapped to an identified one of a plurality of downlink tunnel endpoint identifiers that matches a downlink tunnel endpoint identifier from a tunnel header of the IP message, as well as one of a plurality of sets of UE identifiers that is mapped to the selected multicast group identifier. The RAN may send, for each one of the UE identifiers in the selected set of UE identifiers, the user data packet for transmission to a UE associated with the UE identifier.

In another illustrative example, a user plane entity may be configured to facilitate multicast communication in a mobile network. The user plane entity may receive, over an interface from a data network, a user data packet which includes a multicast group identifier. The user plane entity select, from a plurality of stored mappings, one of a plurality of downlink tunnel endpoint identifiers that is mapped to an identified one of a plurality of multicast group identifiers that matches the multicast group identifier from the user data packet. The user plane entity may tunnel the user data packet in the IP message to or towards the RAN entity via one of a plurality of downlink tunnels associated with the selected downlink tunnel endpoint identifier.

More detailed and alternative techniques and implementations are provided herein as described below.

EXAMPLE EMBODIMENTS

Techniques and mechanisms for use in efficient multicast communication to user equipments (UEs) in mobile networks are described herein. The techniques and mechanisms of the present disclosure may be suitable for use in private Third Generation Partnership Project (3GPP) networks, such as Citizens Broadband Radio Service (CBRS) private Long-Term Evolution (LTE) based networks or private Fifth Generation (5G) networks.

In some implementations, techniques and mechanisms of the present disclosure may employ packet replication at an eNodeB (eNB) or gNodeB (gNB) in the 3GPP network. Packet replication at the eNB or gNB, in contrast to a Packet Data Network (PDN) Gateway (PGW) or User Plane Function (UPF), may advantageously reduce loading on backhaul architecture of the network. The techniques and mechanisms of the present disclosure may provide a simple and efficient way of handling multicast traffic in a private CBRS 3GPP network without the need of new network elements or functions in the core network, and without special support in UE.

FIG. 1 is an illustrative representation of a network architecture 100 of one type of a 3GPP network (or mobile network), namely, a Fourth Generation (4G) LTE based network. Network architecture 100 of the 3GPP network of FIG. 1 may include one or more eNBs (such as an eNB 104) of a Radio Access Network (RAN), a Serving Gateway (SGW) 106, a Mobility Management Entity (MME) 108, a Home Subscriber Server (HSS) 112, a PGW 114, a Policy and Charging Rules Function (PCRF) 116, and a Service Capability Exposure Function (SCEF) 118. Standard connections and interfaces between are indicated in FIG. 1. A user equipment (UE) 102 may gain access to the 3GPP network via eNB 104. UE 102 operating in the 3GPP network may be any suitable type of device, such as a cellular telephone, a smart phone, a tablet device, an Internet of Things (IoT) device, and a machine-to-machine (M2M) device, to name but a few. Communications with nodes or devices in one or more data networks, such as a (Packet) Data Network (PDN) 120, may be provided via PGW 114 via SGW 106.

Network architecture 100 of the 3GPP network of FIG. 1 may be that of a local private 3GPP network operative in shared spectrum of a CBRS band. In some implementations, the local CBRS private 3GPP network may be part of an enterprise private network of an enterprise. Spectrum sharing in a CBRS-based network is facilitated by a spectrum access system (SAS) 180 configured to authorize and manage the use of spectrum of CBRS base stations across different CBRS networks. CBRS provides for use of a 150 MHz-wide broadcast band in the 3550-3700 MHz frequency range, i.e. Time Division (TD) Long-Term Evolution (LTE) (TD-LTE) band "48." There are three types of users allowed to access this spectrum, including incumbent users, Priority Access License (PAL) users, and General Authorized Access (GAA) users. SAS 180 serves to protect incumbents from interference from lower-tier PAL and GAA users, and protects PAL users from interference from other PAL and GAA users. SAS 180 maintains database information of spectrum usage by incumbent, PAL, and GAA users in all census tracts (or areas) and allocates channels to base stations (also referred to as Citizens Broadband Radio Service Devices or "CBSDs") according to a variety of rules.

For example, a Tier-1 type or incumbent users (such as navy ships, military radars and fixed satellite service earth stations) are allocated access to all the channels. A Tier-2 type or PAL users are granted access in the 3550-3650 MHz band and are allowed to use a maximum of seven (7) 10 MHz channels in a census tract (or area). Here, no licensee is allowed to take more than four (4) PAL channels in a census tract. A Tier-3 type or GAA users are allowed access to all the channels, but only channels that are not being used by the other above-indicated users. SAS 180 makes determinations based on multiple factors and informs CBSDs of allowable operating parameters (e.g. frequency band or channel and maximum Effective Isotropic Radiated Power or "EIRP") that it can use at a given point of time, to ensure compliance with regulations with the Federal Communications Commission (FCC) and other regulatory bodies.

Figure 2A:
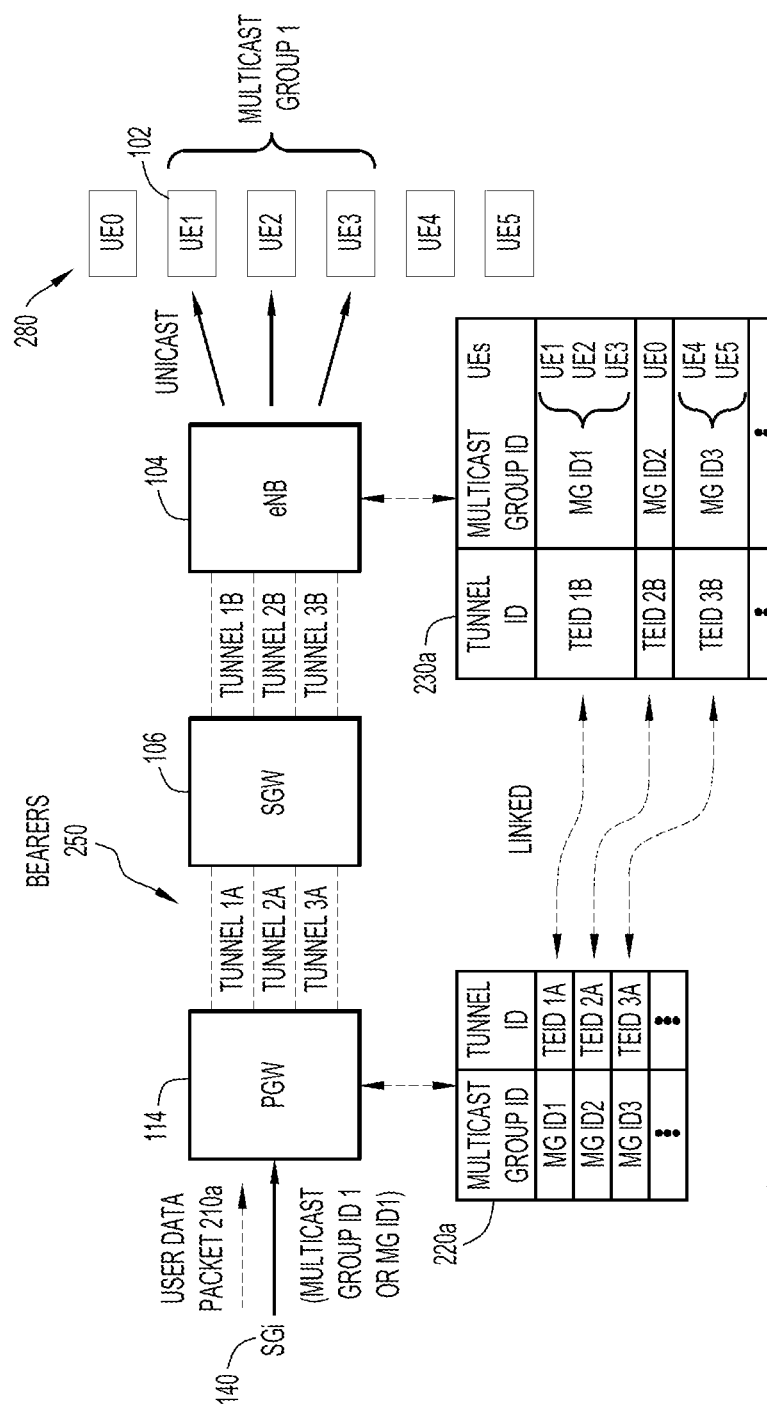
FIG. 2A is an illustrative representation of a network node arrangement of select network nodes of network architecture of FIG. 1, for describing multicast communication for UEs in the 3GPP network according to some implementations of the present disclosure.

FIG. 2A is an illustrative representation of a network node arrangement 200A of select network nodes of network architecture 100 of the 3GPP network of FIG. 1, for use in describing multicast communication according to some implementations of the present disclosure.

In FIG. 2A, network node arrangement 200A includes PGW 114, SGW 106, and eNB 104 of FIG. 1. Specifically in FIG. 2A, PGW 114 may be a PGW user plane (PGW-U) and SGW may be a SGW user plane (SGW-U). A plurality of UEs 280 (e.g. UE0, UE1, UE2, UE3, UE4, and UE5) which include UE 102 (i.e. UE1) are shown to be served by eNB 104. UE 102 may be a member of a plurality of multicast groups associated with a plurality of multicast group identifiers. For example, UE 102 (i.e. UE1) may be a member of a multicast group 1 of which UE2 and UE3 are also members.

A plurality of bearers 250 are shown to be established and maintained between PGW 114 and eNB 104. The plurality of bearers 250 may utilize a plurality of tunnels between PGW 114 and eNB 104. The tunnels may be General Packet Radio Service (GPRS) Tunneling Protocol (GTP) User Plane (GTP-U) tunnels. Each one of the tunnels may be associated with a tunnel endpoint identifier (or "TED") or a pair of tunnel endpoint identifiers (one for uplink and another for downlink). In the example of FIG. 2A, it is shown that tunnels 1A, 1B, and 1C may be maintained between PGW 114 and SGW 106, and (linking) tunnels 1B, 2B, and 3B may be maintained between SGW 106 and eNB 104.

According to at least some implementations, each one of bearers 250 and its associated tunnel(s) may be (uniquely) associated with a respective one of the plurality of multicast groups, for communicating multicast data to members of the multicast group via eNB 104. For example, multicast communication for multicast groups 1, 2, and 3 may be facilitated with use of the bearers represented by tunnels 1A-1B, 2A-2B, and 3A-3B, respectively. Here, note that tunnels 1A-1B, 2A-2B, and 3A-3B are downlink tunnels for downlink communication to UEs 280 being served by eNB 104; uplink tunnels may be provided in the same or similar fashion.

For multicast communication, PGW 114 may maintain a first plurality of stored mappings 220a (e.g. in a first data table) and eNB 104 may maintain a second plurality of stored mappings 230a (e.g. in a second data table). The first plurality of stored mappings 220a may be between the plurality of multicast group identifiers (e.g. MG ID1, MG ID2, and MG ID3) associated with the plurality of multicast groups (e.g. multicast groups 1, 2, and 3) and a plurality of tunnel endpoint identifiers (TEID 1A, TEID 2A, and TEID 3A) associated with the plurality of tunnels (tunnels 1A, 2A, and 3A). The second plurality of stored mappings 230a may be between a plurality of (linking) tunnel endpoint identifiers (TEID 1B, TEID 2B, and TEID 3B) associated with a plurality of (linking) tunnels (linking tunnels 1B, 2B, and 3B) and the plurality of multicast group identifiers (MG ID1, MG ID2, and MG ID3), as well as between the plurality of multicast group identifiers (MG ID1, MG ID2, and MG ID3) and a plurality of sets of UE identifiers each of which identify one or more UEs associated with a multicast group.

As shown in FIG. 2A, a user data packet 210a may be received at PGW 114 over an SGi interface 140 from the data network. User data packet 210a may be sent from the data network for multicast communication to one or more UEs which are members of a multicast group, and therefore may include a multicast group identifier (e.g. a multicast group address as a destination address). In the example of FIG. 2A, the multicast group identifier in user data packet 210a is represented as multicast group ID 1 (i.e. MG ID1) corresponding to multicast group 1.

In response, PGW 114 may operate to select, from the first plurality of stored mappings 220a, one of the tunnel endpoint identifiers (i.e. TEID 1A) that is mapped to an identified one of the multicast group identifiers that matches the multicast group identifier (i.e. MG ID1) from user data packet 210a. PGW 114 may then tunnel or encapsulate user data packet 210a in a first IP message towards eNB 104 via one of the tunnels (i.e. tunnel 1A) associated with the selected tunnel endpoint identifier (i.e. TEID 1A). The first IP message may have a tunnel header including the selected tunnel endpoint identifier (i.e. TEID 1A) and a payload including the user data packet.

The first IP message may be received at SGW 106. SGW 106 may receive the first IP message and perform decapsulation to reveal the underlying user data packet and tunnel header having the tunnel endpoint identifier (i.e. TEID 1A). Note that SGW 106 may have a plurality of stored mappings (not shown in FIG. 2A) which link tunnels 1A, 2A, 3A with tunnels 1B, 2B, and 3B, respectively, by linking or mapping TEIDs 1A, 2A, and 3A with TEIDs 1B, 2B, and 2C, respectively. SGW 106 may therefore link TEID 1A with TEID 1B to select tunnel 1B to eNB 104 for further communication. Accordingly, SGW 106 may tunnel or encapsulate the user data packet in a second IP message to eNB 104 via the selected tunnel (i.e. tunnel 1B) associated with the newly-selected tunnel endpoint identifier (i.e. TEID 1B). The second IP message may have a tunnel header including the selected tunnel endpoint identifier (i.e. TEID 1B) and a payload including the user data packet.

The eNB 104 may receive the user data packet tunneled in the second IP message via one of the plurality of linking downlink tunnels (i.e. tunnel 1B). The eNB 104 may select, from the second plurality of stored mappings 230a, one of the multicast group identifiers (i.e. MG ID1) that is mapped to an identified one of the linking tunnel endpoint identifiers that matches the linking tunnel endpoint identifier (i.e. TEID 1B) from the tunnel header of the second IP message, and/or one of the sets of UE identifiers (i.e. the set including identifiers for UE1, UE2, and UE3) that is mapped to the selected multicast group identifier (i.e. MG ID1). Then, eNB 104 may send, for each one of at least some of the UE identifiers in the selected set of UE identifiers associated with the selected multicast group identifier, the user data packet for (unicast) transmission to a UE associated with the UE identifier. Here, UE1, UE2, and UE3 being served by eNB 104 may receive the multicast communication of the user data packet.

The steps described in relation to FIG. 2A may be repeated for each one of a plurality of user data packets of the multicast communication to the multicast group. In addition, the above-described steps may be repeated for each one of the plurality of multicast groups.

Figure 2B:
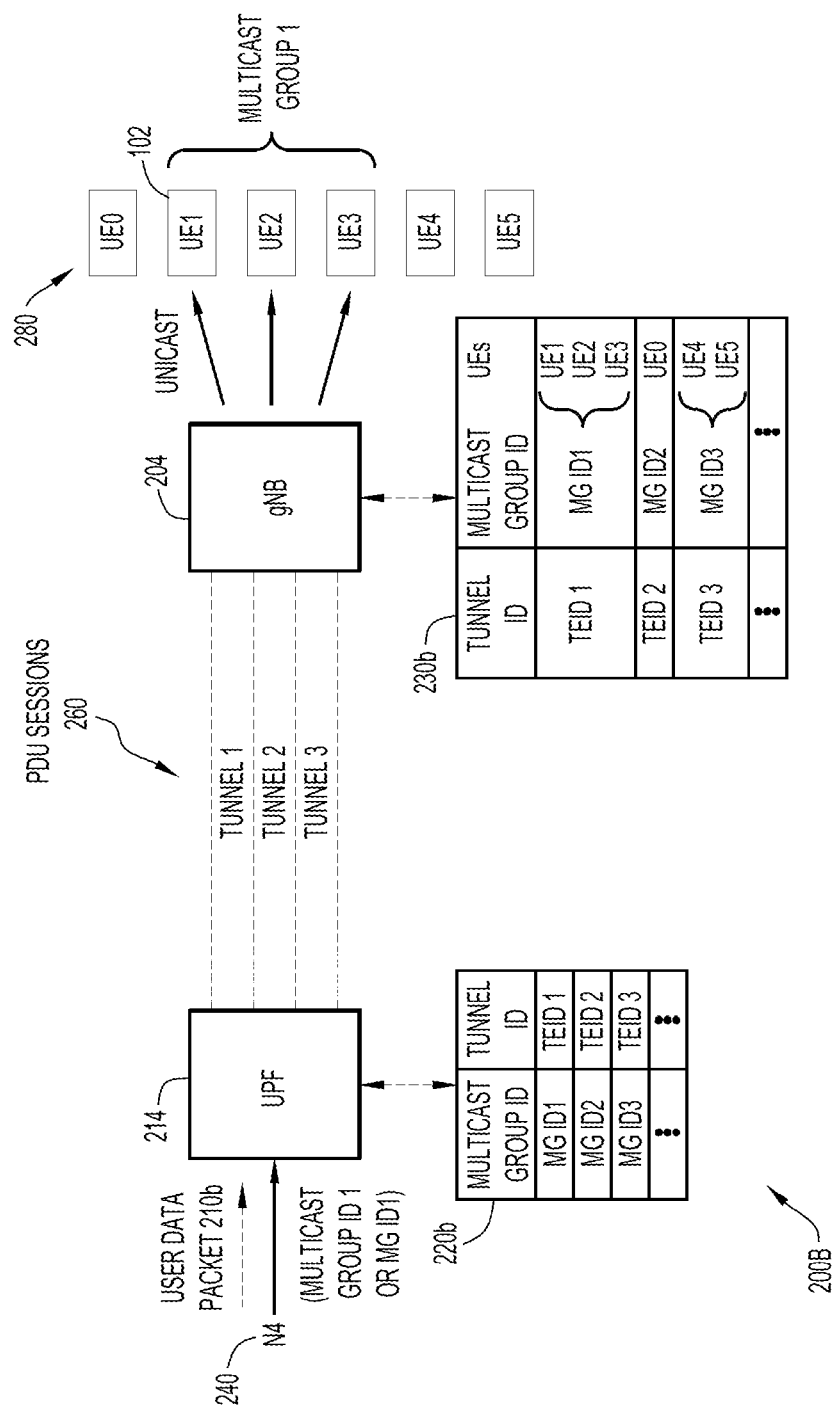
FIG. 2B is an illustrative representation of a network node arrangement of select network nodes of another type of 3GPP network, namely, a Fifth Generation (5G) network, for describing multicast communication for UEs according to some implementations of the present disclosure.

FIG. 2B is an illustrative representation of a network node arrangement 200B of select network nodes of a 5G network for describing multicast communication according to some implementations of the present disclosure. In FIG. 2B, network node arrangement 200B for the 5G network includes a UPF 214 and a gNB 204. As compared to FIG. 2A, the plurality of bearers are replaced with a plurality of Packet Data Unit (PDU) sessions 260 which are established and maintained between UPF 214 and gNB 204. The plurality of PDU sessions 260 may utilize a plurality of tunnels between UPF 214 and gNB 204. Here, the plurality of tunnels are indicated as tunnels 1, 2, and 3 which may be associated with tunnel endpoint identifiers TEID 1, TEID 2, and TEID 3, respectively. In the example of FIG. 2B, linking between tunnels or linking tunnels need not be utilized.

For multicast communication, UPF 214 may maintain a first plurality of stored mappings 220b and gNB 204 may maintain a second plurality of stored mappings 230b. The first plurality of stored mappings 220b may be between the plurality of multicast group identifiers (e.g. MG ID1, MG ID2, and MG ID3) associated with the plurality of multicast groups (e.g. multicast groups 1, 2, and 3) and the plurality of tunnel endpoint identifiers (TED 1, TEID 2, and TED 3) associated with the plurality of tunnels (tunnels 1A, 2A, and 3A). The second plurality of stored mappings 230b may be between the plurality of tunnel endpoint identifiers (TEID 1, TED 2, and TEID 3) associated with the plurality of tunnels (tunnels 1, 2, and 3) and the plurality of multicast group identifiers (MG ID1, MG ID2, and MG ID3), as well as between the plurality of multicast group identifiers (MG ID1, MG ID2, and MG ID3) and the plurality of sets of UE identifiers each of which identify one or more UEs associated with a multicast group.

As shown in FIG. 2B, a user data packet 210b may be received at UPF 214 over an N4 interface 240 from a data network. User data packet 210b may be sent from the data network for multicast communication to one or more UEs which are members of a multicast group, and therefore may include a multicast group identifier (e.g. a multicast group address as a destination address). Again, in the example of FIG. 2A, the multicast group identifier in user data packet 210b is represented as multicast group ID 1 (i.e. MG ID1) corresponding to multicast group 1.

UPF 214 may operate to select, from the first plurality of stored mappings 220b, one of the tunnel endpoint identifiers (i.e. TEID 1) that is mapped to an identified one of the multicast group identifiers that matches the multicast group identifier (i.e. MG ID1) from the user data packet 210b. UPF 214 may then tunnel or encapsulate user data packet 210b in an IP message to gNB 204 via one of the tunnels (i.e. tunnel 1) associated with the selected tunnel endpoint identifier (i.e. TEID 1). The IP message may have a tunnel header including the selected tunnel endpoint identifier (i.e. TED 1) and a payload including the user data packet.

The gNB 204 may receive the user data packet tunneled in the IP message via one of the plurality of downlink tunnels (i.e. tunnel 1). The gNB 204 may select, from the second plurality of stored mappings 230b, one of the multicast group identifiers (i.e. MG ID1) that is mapped to an identified one of the tunnel endpoint identifiers that matches the tunnel endpoint identifier (i.e. TED 1) from the tunnel header of the IP message, and/or one of the sets of UE identifiers (i.e. the set including identifiers for UE1, UE2, and UE3) that is mapped to the selected multicast group identifier (i.e. MG ID1). Then, gNB 204 may send, for each one of at least some of the UE identifiers in the selected set of UE identifiers associated with the selected multicast group identifier, the user data packet for transmission to a UE associated with the UE identifier. Here, UE1, UE2, and UE3 being served by gNB 204 may receive the multicast communication of the user data packet.

The steps described in relation to FIG. 2B may be repeated for each one of a plurality of user data packets of the multicast communication to the multicast group. Note also that the above-described steps may be repeated for each one of the plurality of multicast groups.

Figure 3A:
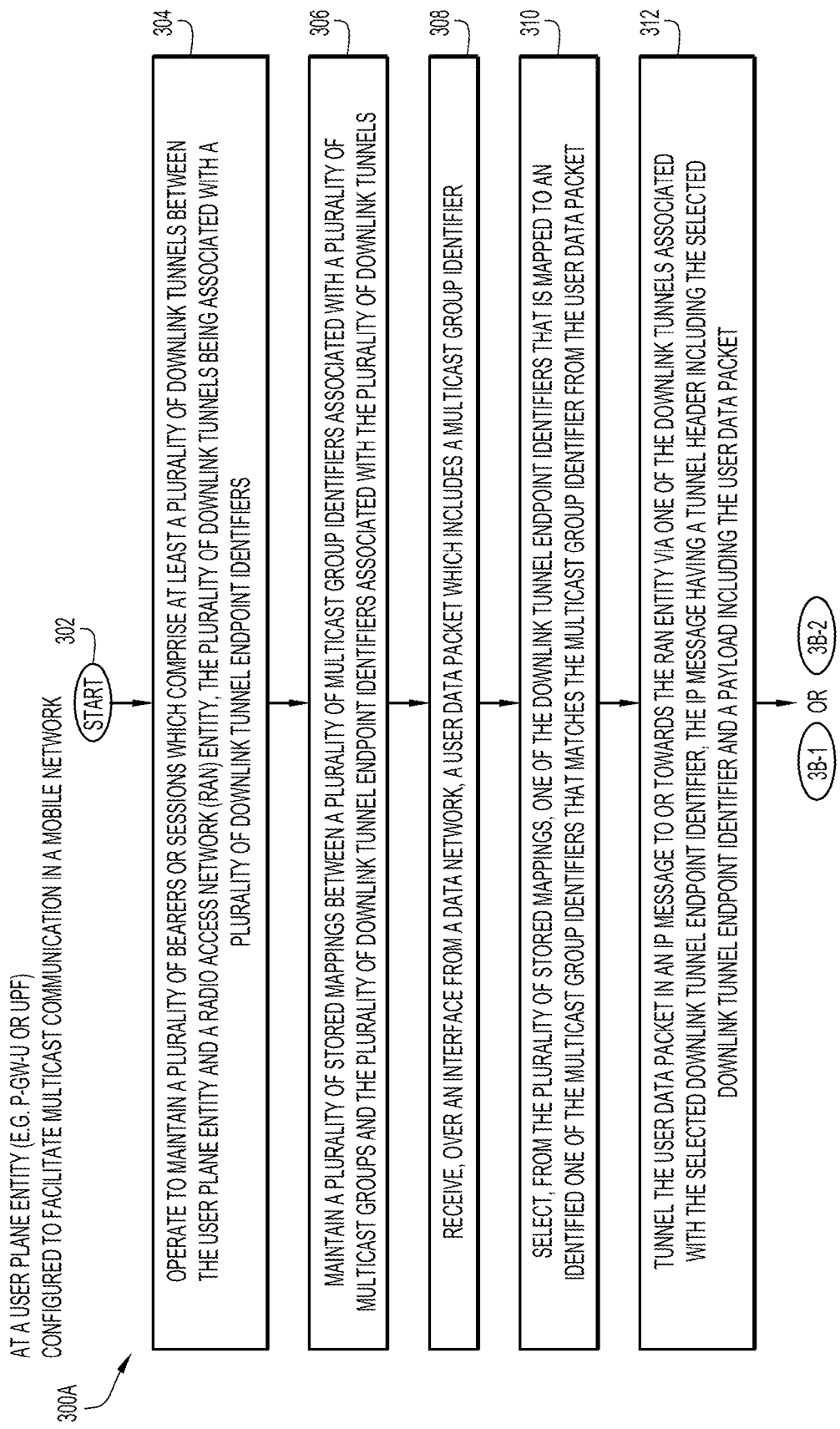
FIG. 3A is a flowchart for describing a method for use in facilitating multicast communication for UEs in a 3GPP network according to some implementations of the present disclosure, which may be performed by a user plane entity of the 3GPP network.

FIG. 3A is a flowchart 300A for describing a method for use in facilitating multicast communication for UEs in a 3GPP network according to some implementations. The method may be performed by a user plane entity in the 3GPP network, such as a PGW-U, UPF, or the like. The method may be embodied as a computer program product which includes a computer readable medium having computer instructions stored therein which are executed by one or more processors of the user plane entity. The method of FIG. 3A assumes that the bearers or sessions utilizing the tunnels for multicast communication are already established; the establishment procedures for multicast communication may be performed as described below in relation to FIGS. 6 and/or 7A-7D.

Beginning at a start block 302 of FIG. 3A, the user plane entity may operate to maintain a plurality of bearers or sessions which utilize at least a plurality of downlink tunnels between the user plane entity and a RAN entity (step 304 of FIG. 3A). The plurality of downlink tunnels may be associated with a plurality of downlink tunnel endpoint identifiers. The user plane entity may maintain a plurality of stored mappings between a plurality of multicast group identifiers associated with a plurality of multicast groups and the plurality of downlink tunnel endpoint identifiers associated with the plurality of downlink tunnels (step 306 of FIG. 3A).

The user plane entity may receive, over an interface from a data network, a user data packet which includes a multicast group identifier (step 308 of FIG. 3A). The user plane entity may select, from the plurality of stored mappings, one of the downlink tunnel endpoint identifiers that is mapped to an identified one of the multicast group identifiers that matches the multicast group identifier from the user data packet (step 310 of FIG. 3A). The user plane entity may tunnel the user data packet in an IP message to or towards the RAN entity via one of the downlink tunnels associated with the selected downlink tunnel endpoint identifier (step 312 of FIG. 3A). The IP message may have a tunnel header including the selected downlink tunnel endpoint identifier and a payload including the user data packet.

Note that, in FIG. 3A, steps 308, 310, and 312 may be repeated for each one of a plurality of user data packets of the multicast communication to the multicast group. Steps 308, 310, and 312 of FIG. 3A may also be repeated for each one of the plurality of multicast groups.

Figures 1, 3B:
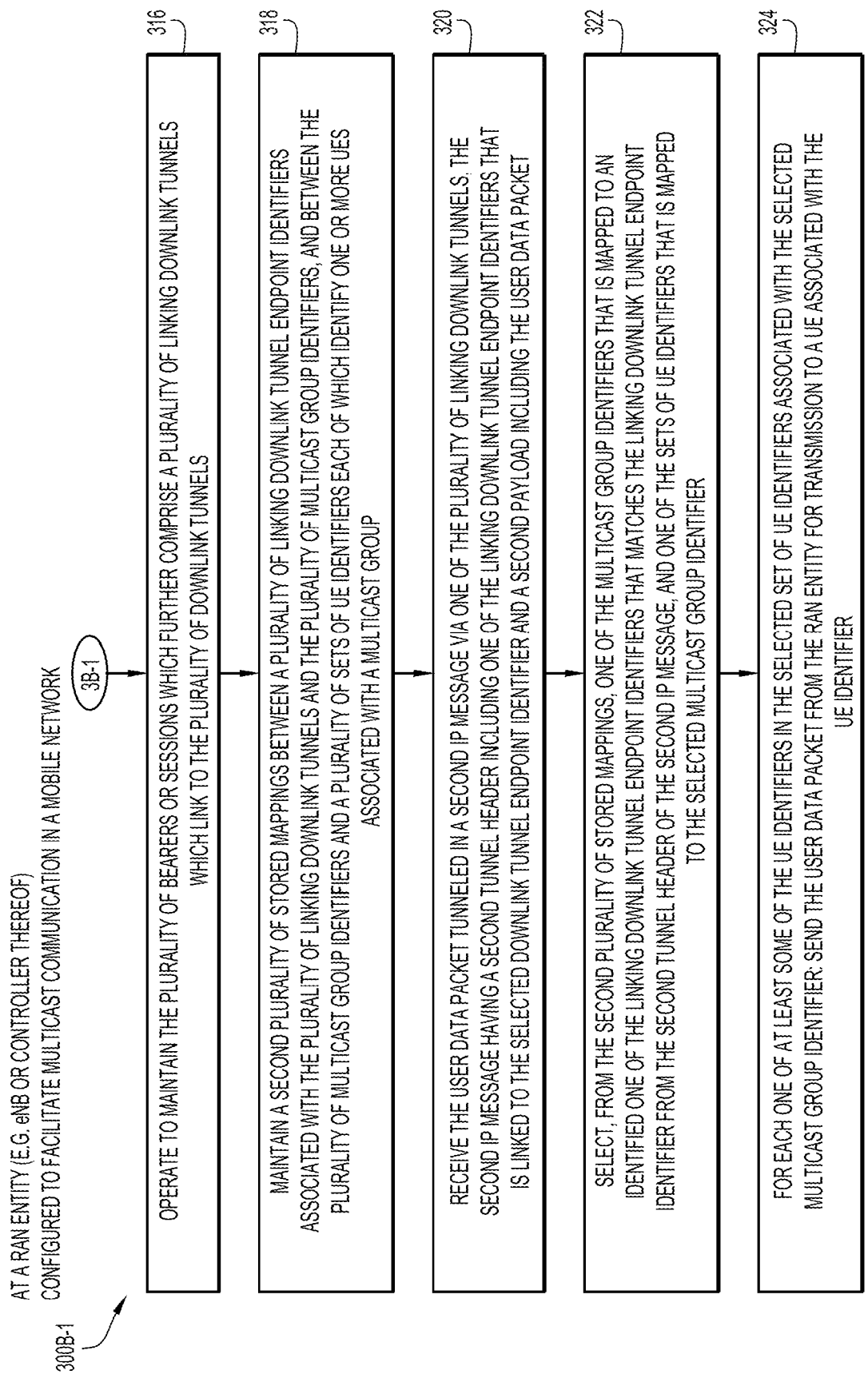
Figure 4A:
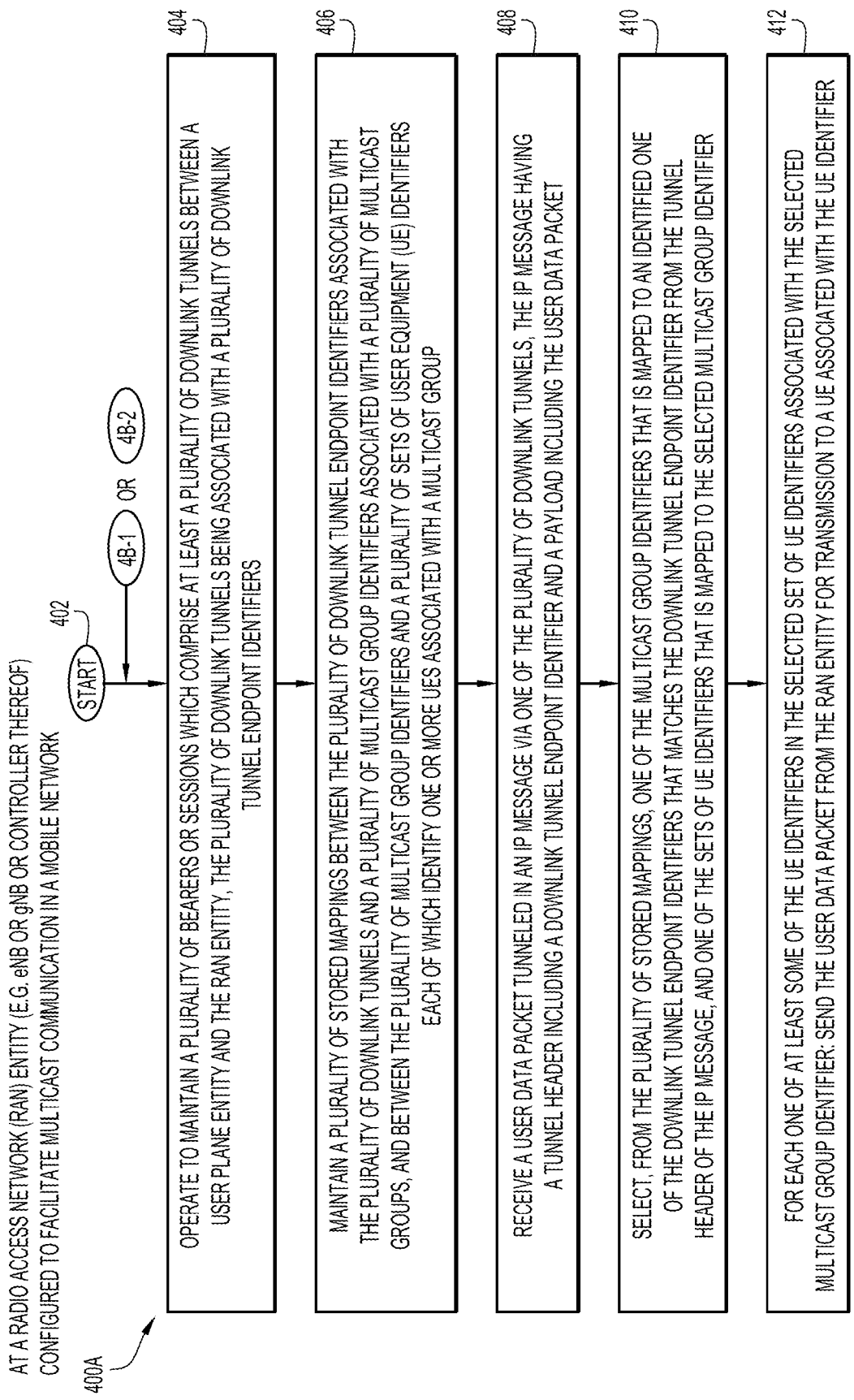
FIG. 4A is a flowchart for describing a method for use in facilitating multicast communication for UEs in a 3GPP network according to some implementations of the present disclosure, which may be performed by a RAN entity (e.g. an eNodeB or gNodeB) of the 3GPP network.
Figures 2, 4B:
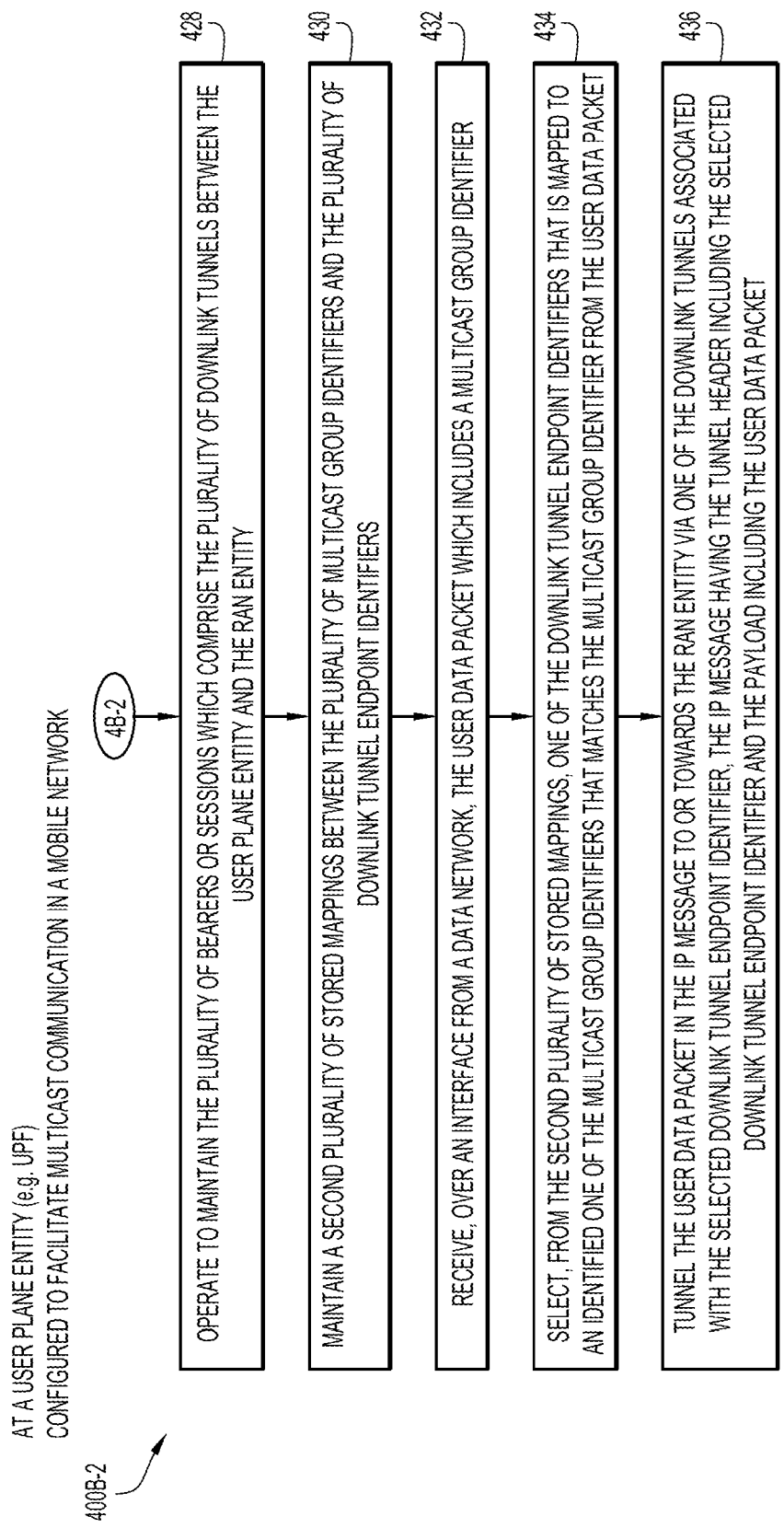

The method of the flowchart 300A of FIG. 3A may end at step 312, but processing may continue via a connector 3B-1 to FIG. 3B-1 (e.g. where the user plane entity is a PGW-U and/or linking tunnels are utilized) or via a connector 3B-2 to FIG. 3B-2 (e.g. where the user plane entity is a UPF and/or no linking tunnels are utilized).

FIG. 3B-1 is a flowchart 300B-1 for describing a method for use in facilitating multicast communication for UEs in a 3GPP network according to some implementations. The method of FIG. 3B-1 may follow the method of FIG. 3A, where the user plane entity operates in connection with a RAN entity configured to perform the method of FIG. 3B-1. In FIG. 3B-1, the user plane entity may be a PGW-U which operates in connection with a RAN entity which may be an eNB, where the PGW-U communicates with the eNB via a SGW-U. The method may be embodied as a computer program product which includes a computer readable medium having computer instructions stored therein which are executed by one or more processors of the RAN entity. Again, the method of FIG. 3B-1 may follow the method of FIG. 3A, where in FIG. 3A the plurality of stored mappings may be characterized as a first plurality of stored mappings.

Beginning at a connector 3B-1 of FIG. 3B-1, the RAN entity may operate to maintain the plurality of bearers or sessions, which further utilize a plurality of linking downlink tunnels which link to the plurality of downlink tunnels (step 316 of FIG. 3B-1). The RAN entity may maintain a second plurality of stored mappings between a plurality of linking downlink tunnel endpoint identifiers associated with the plurality of linking downlink tunnels and the plurality of multicast group identifiers, and between the plurality of multicast group identifiers and a plurality of sets of UE identifiers each of which identify one or more UEs associated with a multicast group (step 318 of FIG. 3B-1). The RAN entity may receive a user data packet tunneled in an IP message via one of the plurality of linking downlink tunnels (step 320 of FIG. 3B-1). The IP message having a tunnel header including one of the linking downlink tunnel endpoint identifiers that is linked to the selected downlink tunnel endpoint identifier and a payload including the user data packet. The RAN entity may select, from the second plurality of stored mappings, one of the multicast group identifiers that is mapped to an identified one of the linking downlink tunnel endpoint identifiers that matches the linking downlink tunnel endpoint identifier from the tunnel header of the IP message, and/or one of the sets of UE identifiers that is mapped to the selected multicast group identifier (step 322 of FIG. 3B-1). The RAN entity may send, for each one of at least some of the UE identifiers in the selected set of UE identifiers associated with the selected multicast group identifier, the user data packet from the RAN entity for transmission to a UE associated with the UE identifier (step 324 of FIG. 3B-1).

Note that, in FIG. 3B-1, steps 320, 322, and 324 may be repeated for each one of a plurality of user data packets of the multicast communication to the multicast group. Steps 320, 322, and 324 of FIG. 3B-1 may be repeated for each one of the plurality of multicast groups.

FIG. 3B-2 is a flowchart 300B-2 for describing a method for use in facilitating multicast communication for UEs in a 3GPP network according to some implementations. The method of FIG. 3B-2 may follow the method of FIG. 3A, where the user plane entity operates in connection with a RAN entity configured to perform the method of FIG. 3B-2. In FIG. 3B-2, the user plane entity may be a UPF which operates in connection with a RAN entity which may be a control unit of a gNB, where the UPF communicates with the control unit of the gNB (e.g. directly without linking tunnels). The method may be embodied as a computer program product which includes a computer readable medium having computer instructions stored therein which are executed by one or more processors of the RAN entity. Again, the method of FIG. 3B-2 may follow the method of FIG. 3A, where in FIG. 3A the plurality of stored mappings may be characterized as a first plurality of stored mappings.

Beginning at a connector 3B-2 of FIG. 3B-2, the RAN entity may operate to maintain the plurality of bearers or sessions which utilize the plurality of downlink tunnels (step 328 of FIG. 3B-2). The RAN entity may maintain a second plurality of stored mappings between the plurality of downlink tunnel endpoint identifiers and the plurality of multicast group identifiers, and between the plurality of multicast group identifiers and a plurality of sets of UE identifiers each of which identify one or more UEs associated with a multicast group (step 330 of FIG. 3B-2). The RAN entity may receive the user data packet tunneled in the IP message via one of the plurality of downlink tunnels (step 332 of FIG. 3B-2). The RAN entity may select, from the second plurality of stored mappings, one of the multicast group identifiers that is mapped to an identified one of the downlink tunnel endpoint identifiers that matches the tunnel endpoint identifier from the tunnel header of the IP message, and/or one of the sets of UE identifiers that is mapped to the selected multicast group identifier (step 334 of FIG. 3B-2). The RAN entity may send, for each one of at least some of the UE identifiers in the selected set of UE identifiers associated with the selected multicast group identifier, the user data packet from the RAN entity for transmission to a UE associated with the UE identifier (step 336 of FIG. 3B-2).

Note that, in FIG. 3B-2, steps 332, 334, and 336 may be repeated for each one of a plurality of user data packets of the multicast communication to the multicast group. Steps 332, 334, and 336 of FIG. 3B-2 may be repeated for each one of the plurality of multicast groups.

FIG. 4A is a flowchart 400A for describing a method for use in facilitating multicast communication for UEs in a 3GPP network according to some implementations. The method may be performed by a RAN entity in the 3GPP network, such as an eNB, a gNB, or the like. The method may be embodied as a computer program product which includes a computer readable medium having computer instructions stored therein which are executed by one or more processors of the user plane entity. The method of FIG. 4A assumes that the bearers or sessions utilizing the tunnels for multicast communication are already established; the establishment procedures for multicast communication may be performed as described below in relation to FIGS. 6 and/or 7A-7D.

Beginning at a start block 402 of FIG. 4A, the RAN entity may operate to maintain a plurality of bearers or sessions which utilize at least a plurality of downlink tunnels between a user plane entity and the RAN entity (step 404 of FIG. 4A). The plurality of downlink tunnels may be associated with a plurality of downlink tunnel endpoint identifiers. The RAN entity may maintain a plurality of stored mappings between the plurality of downlink tunnel endpoint identifiers associated with the plurality of downlink tunnels and a plurality of multicast group identifiers associated with a plurality of multicast groups, and between the plurality of multicast group identifiers and a plurality of sets of UE identifiers each of which identify one or more UEs associated with a multicast group (step 406 of FIG. 4A).

The RAN entity may receive a user data packet tunneled in an IP message via one of the plurality of downlink tunnels (step 408 of FIG. 4A). The IP message may have a tunnel header including a downlink tunnel endpoint identifier and a payload including the user data packet. The RAN entity may select, from the plurality of stored mappings, one of the multicast group identifiers that is mapped to an identified one of the downlink tunnel endpoint identifiers that matches the downlink tunnel endpoint identifier from the tunnel header of the IP message, and/or one of the sets of UE identifiers that is mapped to the selected multicast group identifier (step 410 of FIG. 4A). The RAN entity may send, for each one of at least some of the UE identifiers in the selected set of UE identifiers associated with the selected multicast group identifier, the user data packet from the RAN entity for transmission to a UE associated with the UE identifier (step 412 of FIG. 4A).

Note that, in FIG. 4A, steps 408, 410, and 412 may be repeated for each one of a plurality of user data packets of the multicast communication to the multicast group. Steps 408, 410, and 412 of FIG. 4A may be repeated for each one of the plurality of multicast groups.

Note that the method of the flowchart 400A of FIG. 4A may begin at step 404, but processing associated with the data packet may have previously occurred through a connector 4B-1 to FIG. 4B-1 (e.g. where the user plane entity is a PGW-U and/or linking tunnels are utilized) or via a connector 4B-2 to FIG. 4B-2 (e.g. where the user plane entity is a UPF and/or no linking tunnels are utilized).

FIG. 4B-1 is a flowchart 400B-1 for describing a method for use in facilitating multicast communication for UEs in a 3GPP network according to some implementations. The method of FIG. 4B-1 may precede the method of FIG. 4A, where the RAN entity operates in connection with a user plane entity configured to perform the method of FIG. 4B-1. In FIG. 4B-1, the RAN entity may be an eNB which operates in connection with a user plane entity which may be a PGW-U, where the eNB communicates with the PGW-U via a SGW-U. The method may be embodied as a computer program product which includes a computer readable medium having computer instructions stored therein which are executed by one or more processors of the user plane entity. Again, the method of FIG. 4B-1 may precede the method of FIG. 4A, where in FIG. 4A the plurality of stored mappings may be characterized as a first plurality of stored mappings.

Beginning at a connector 4B-1 of FIG. 4B-1, the user plane entity may operate to maintain the plurality of bearers or sessions which utilize a plurality of linking downlink tunnels which link to the plurality of downlink tunnels (step 416 of FIG. 4B-1). The user plane entity may maintain a second plurality of stored mappings between the plurality of multicast group identifiers and a plurality of linking downlink tunnel endpoint identifiers associated with the plurality of linking downlink tunnels (step 418 of FIG. 4B-1). The user plane entity may receive, over an interface from a data network, the user data packet which includes a multicast group identifier (step 420 of FIG. 4B-1). The user plane entity may select, from the second plurality of stored mappings, one of the linking downlink tunnel endpoint identifiers that is mapped to an identified one of the multicast group identifiers that matches the multicast group identifier from the user data packet (step 422 of FIG. 4B-1). The user plane entity may tunnel the user data packet an IP message to or towards the RAN entity via one of the linking downlink tunnels associated with the selected linking downlink tunnel endpoint identifier (step 424 of FIG. 4B-1). The IP message having a second tunnel header including the selected linking downlink tunnel endpoint identifier and a payload including the user data packet. The selected linking downlink tunnel endpoint identifier is linked to the selected downlink tunnel endpoint identifier.

Note that, in FIG. 4B-1, steps 420, 422, and 424 may be repeated for each one of a plurality of user data packets of the multicast communication to the multicast group. Steps 420, 422, and 424 of FIG. 4B-1 may be repeated for each one of the plurality of multicast groups.

FIG. 4B-2 is a flowchart 400B-2 for describing a method for use in facilitating multicast communication for UEs in a 3GPP network according to some implementations. The method of FIG. 4B-2 may precede the method of FIG. 4A, where the RAN entity operates in connection with a user plane entity configured to perform the method of FIG. 4B-2. In FIG. 4B-2, the RAN entity may be a control unit of a gNB which operates in connection with a user plane entity which may be a UPF, where the control unit of the gNB communicates with the UPF (e.g. without any linking tunnels). The method may be embodied as a computer program product which includes a computer readable medium having computer instructions stored therein which are executed by one or more processors of the user plane entity. Again, the method of FIG. 4B-2 may precede the method of FIG. 4A, where in FIG. 4A the plurality of stored mappings may be characterized as a first plurality of stored mappings.

Beginning at a connector 4B-2 of FIG. 4B-2, the user plane entity may operate to maintain the plurality of bearers or sessions which utilize the plurality of downlink tunnels between the user plane entity and the RAN entity (step 428 of FIG. 4B-2). The user plane entity may maintain a second plurality of stored mappings between the plurality of multicast group identifiers and the plurality of downlink tunnel endpoint identifiers (step 430 of FIG. 4B-2). The user plane entity may receive, over an interface from a data network, the user data packet which includes a multicast group identifier (step 432 of FIG. 4B-2). The user plane entity may select, from the second plurality of stored mappings, one of the downlink tunnel endpoint identifiers that is mapped to an identified one of the multicast group identifiers that matches the multicast group identifier from the user data packet (step 434 of FIG. 4B-2). The user plane entity may tunnel the user data packet in the IP message to or towards the RAN entity via one of the downlink tunnels associated with the selected downlink tunnel endpoint identifier (step 436 of FIG. 4B-2). The IP message may have the tunnel header including the selected downlink tunnel endpoint identifier and the payload including the user data packet.

Note that, in FIG. 4B-2, steps 432, 434, and 436 may be repeated for each one of a plurality of user data packets of the multicast communication to the multicast group. Steps 432, 434, and 436 of FIG. 4B-2 may be repeated for each one of the plurality of multicast groups.

Figure 5:
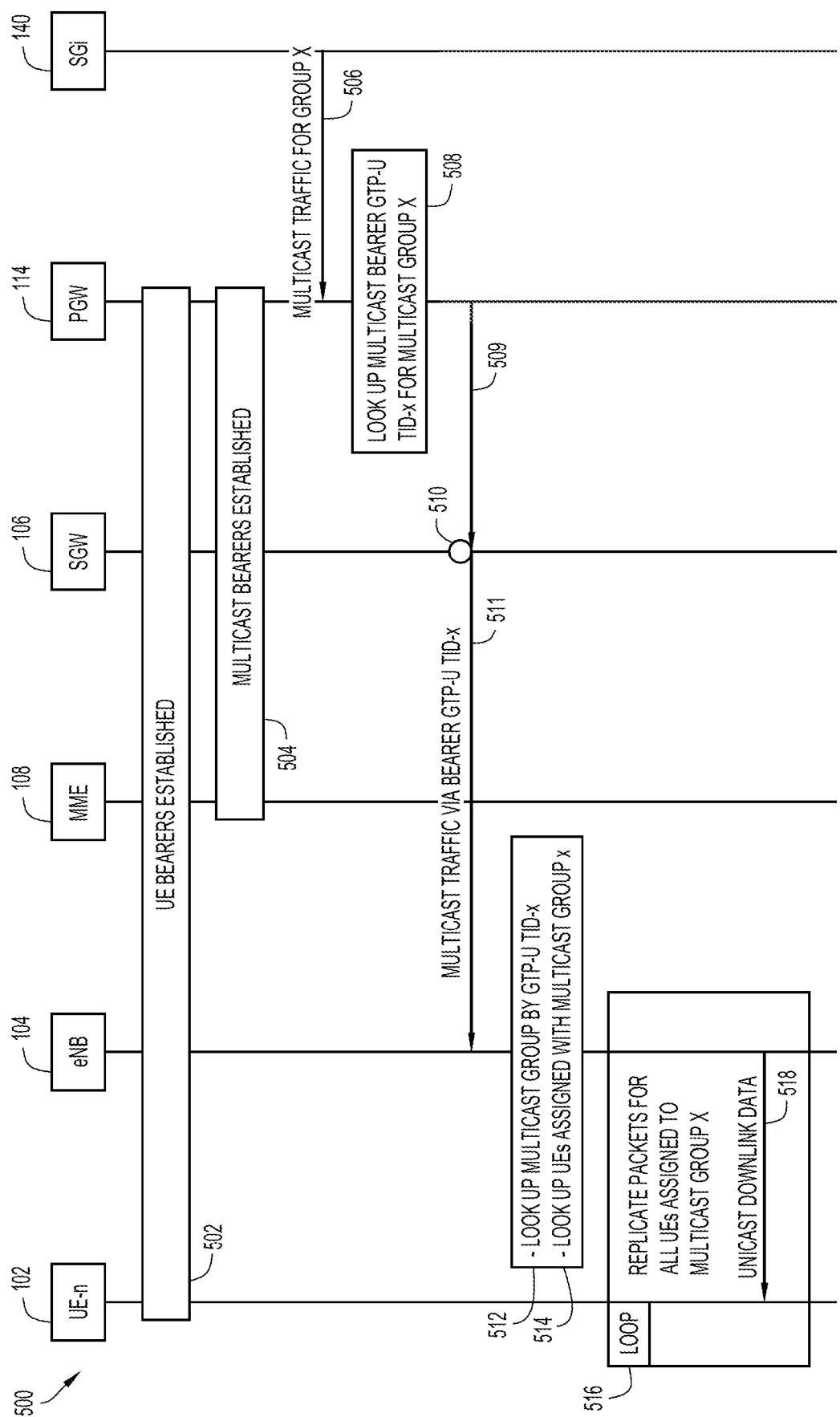
FIG. 5 is a call flow diagram for describing a method for use in facilitating multicast communication for UEs in a 3GPP network according to some implementations of the present disclosure.

FIG. 5 is a call flow diagram 500 for describing a method for use in facilitating multicast communication for UEs in a 3GPP network according to some implementations. The method of FIG. 5 may utilize the techniques described in relation to the previous figures, as well as some of the techniques described later in relation to FIGS. 6 and 7A-7D. In FIG. 5, PGW 114 may be a PGW-U and SGW 106 may be SGW-U.

To begin in FIG. 5, a plurality of bearers for UE 102 may be established (step 502 of FIG. 5). Next, a plurality of bearers for multicast communication for UE 102 may be established (step 504 of FIG. 5). Subsequently, PGW 114 may receive multicast traffic for a multicast group associated with a multicast group identifier (e.g. multicast group "X") over SGi interface 140 (step 506 of FIG. 5). In response, PGW 114 may select, from its stored mappings based on the multicast group identifier, one of a plurality of downlink tunnels associated with a downlink tunnel endpoint identifier (step 508 of FIG. 5). PGW 114 may then tunnel the multicast traffic in a first IP message to SGW 106 via the selected downlink tunnel (step 509 of FIG. 5). SGW 106 may receive the first IP message, decapsulate the first IP message, and perform a linking between tunnel endpoint identifiers (based on a stored mapping of tunnel endpoint identifiers) (step 510 of FIG. 5). SGW 106 may then re-encapsulate and tunnel the multicast traffic in a second IP message to eNB 104 via a linking downlink tunnel (step 511 of FIG. 5). The eNB 104 may receive the second IP message and decapsulate the second IP message. The eNB 104 may then select, from its stored mappings based on the downlink tunnel identifier, one of the plurality of multicast group identifiers (step 512 of FIG. 5) and/or one of the sets of UE identifiers that is mapped to the selected multicast group identifier (step 514 of FIG. 5). In a procedure 516 of FIG. 5, for each one of at least some of the UE identifiers in the selected set of UE identifiers associated with the selected multicast group identifier, the eNB 104 may send the multicast traffic (unicast) for transmission to a UE associated with the UE identifier (step 518 of FIG. 5).

FIG. 6 is a flowchart 600 for describing a method for use in establishing a plurality of bearers or sessions associated with a plurality of multicast groups in a 3GPP network, for use in facilitating multicast communication for UEs in the 3GPP network according to some implementations. The method may be performed by a control plane entity, and more particularly, a control plane entity for mobility management, such as an MME or an access and mobility management (AMF) of a 5G network. The method may be embodied as a computer program product which includes a computer readable medium having computer instructions stored therein which are executed by one or more processors of the control plane entity.

Beginning at a start block 602 of FIG. 6, the control plane entity may obtain a plurality of multicast group identifiers corresponding to a plurality of multicast groups of which a UE is a member (step 604 of FIG. 6). Using the obtained multicast group identifiers, the control plane entity may then facilitate establishment of a plurality of bearers or sessions which comprise a respective plurality of tunnels between a user plane entity and a RAN entity, such that each bearer or session corresponds to a respective one of the multicast groups for communicating multicast data to members of the multicast group (e.g. via the RAN entity) (step 606 of FIG. 6). In addition, facilitating the establishment of the plurality of bearers or sessions may be further performed by, for each multicast group identifier, sending to the user plane entity a message indicating a request for creating the bearer or session for the multicast group, as well as for creating at the user plane entity a stored mapping between one of the multicast group identifiers and a respective one of the downlink tunnel endpoint identifiers (step 608a of FIG. 6). When this step is performed for each multicast group identifier, a plurality of stored mappings between the multicast group identifiers and the downlink tunnel endpoint identifiers are created at the user plane entity. In addition, facilitating the establishment of the plurality of bearers or sessions may further be performed by sending to the RAN entity a message indicating a request for setting up a bearer or session, and for creating at the RAN entity a plurality of stored mappings between the downlink tunnel endpoint identifiers and the multicast group identifiers, and with a plurality of sets of UE identifiers each of which identify one or more UEs associated with a multicast group (step 608*b* of FIG. 6).

In some implementations of step 606 of FIG. 6, the plurality of multicast group identifiers associated with the plurality of multicast groups associated with UE may be obtained at the control plane entity by receiving, from the UE, one or more messages which include the plurality of multicast group identifiers. In other implementations, the plurality of multicast group identifiers may be obtained by the control plane entity by retrieving, from a subscriber database or repository, the plurality of multicast group identifiers stored in association with a UE identifier of the UE. In yet other implementations, the plurality of multicast group identifiers associated with the plurality of multicast groups associated with UE may be obtained at the control plane entity by obtaining, from a policy function (e.g. a PCRF, or a Policy Control Function or "PCF"), the plurality of multicast group identifiers corresponding to the plurality of multicast groups in a procedure for creating a session between the user plane entity and the RAN entity. Such implementations of step 606 of FIG. 6 are described in the optional procedures (a), (b) and (c) indicated a call flow diagram 700B of FIG. 7B described later below FIGS. 7A, 7B, 7C, and 7D are call flow diagrams 700A, 700B, 700C, and 700D, respectively, for describing a method for use in establishing a plurality of bearers or sessions associated with a plurality of multicast groups of a UE, for facilitating multicast communication for UEs in a 3GPP network according to some implementations of the present disclosure. The plurality of bearers or sessions may be used for multicast communication for UEs, for example, as described in the previous figures. In FIGS. 7A-7D, PGW 114 may be a PGW-U and SGW 106 may be SGW-U. As will become apparent, various techniques may be performed by an eNB (or a gNB), an MME (or an AMF), or a PGW-U (or a UPF). Each technique may be embodied as a computer program product which includes a computer readable medium having computer instructions stored therein which are executed by one or more processors of the corresponding entity.

To begin with the call flow diagram 700A of FIG. 7A, UE 102 may send to eNB 104 a message indicating a radio resource control (RRC) connection request (step 702 of FIG. 7A). The eNB 104 may receive this message from UE 102, perform relevant processing, and send back to UE 102 a message indicating a RRC connection setup (step 704 of FIG. 7A). UE 102 may receive this message and reply to the eNB 104 with a message indicating an RRC connection setup complete (step 706 of FIG. 7A). After the RRC connection is setup, UE may send to the eNB 104 a message indicating an attach request (step 708 of FIG. 708). The message may include a UE identifier, such as an International Mobile Subscriber Identity (IMSI) of UE 102. The eNB 104 may receive this message and send to MME 108 a corresponding message indicating an Initial UE message for registration (step 710 of FIG. 7A). UE 102 may then perform a procedure for non-access stratum (NAS) authentication as well as a location update (step 712 of FIG. 7A).

Figure 7B:
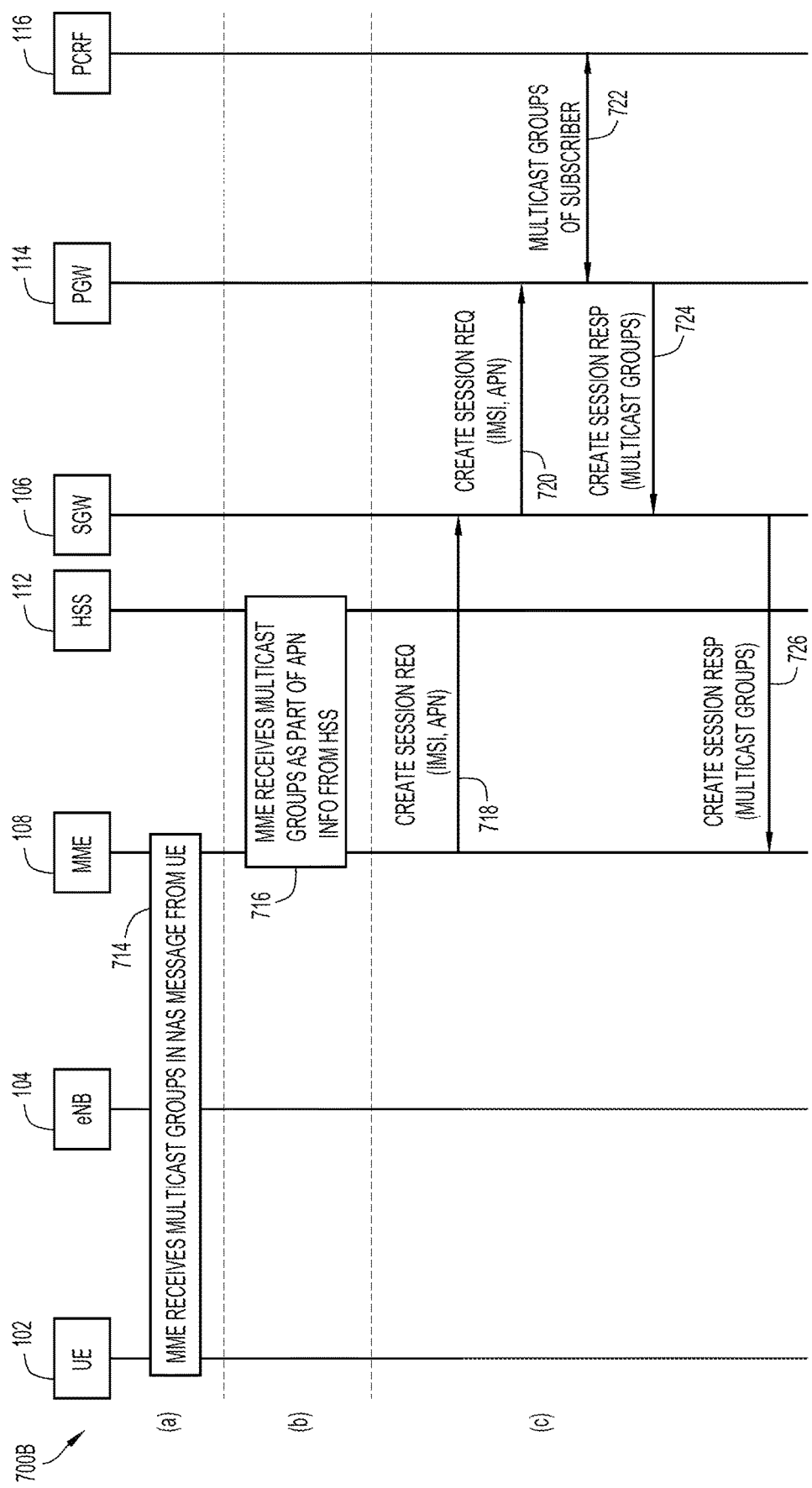

Continuing the method in the call flow diagram 700B of FIG. 7B, one or more procedures may be performed so that MME 108 may obtain a plurality of multicast group identifiers associated with a plurality of multicast groups associated with UE 102. Various optional procedures for MME 108 obtaining the plurality of multicast group identifiers are indicated as procedures (a), (b) and (c) in FIG. 7B.

In a procedure (a) of FIG. 7B, UE 102 may send to MME 108 one or more messages (e.g. NAS messages) which include the multicast group identifiers of the multicast groups associated with UE 102 (step 714 of FIG. 7B).

In a procedure (b) of FIG. 7B, MME 108 may retrieve from HSS 112 (or from some other subscriber database or repository) the plurality of multicast group identifiers associated with the plurality of multicast groups associated with UE 102 (step 716 of FIG. 7B). Here, in some implementations, MME 108 may obtain the multicast group identifiers together with its retrieval of access point name (APN) information and/or subscriber profile information stored in association with a UE identifier of the UE (e.g. in a location update procedure).

In a procedure (c) of FIG. 7B, MME 108 may obtain the plurality of multicast group identifiers from PCRF 116 in a procedure for creating a session with PGW 114 for communication. Here, PCRF 116 may store multicast group identifiers of multicast groups for each UE in advance for subsequent retrieval (e.g. retrieval based on IMSI). In procedure (c), MME 108 may send to SGW 106 a message indicating a create session request (step 718 of FIG. 7B). The message may include the IMSI of UE 102 and the APN. SGW 106 may receive this message and, in turn, send to PGW 114 a corresponding message indicating a corresponding create session request (step 720 of FIG. 7B). PGW 114 may receive this message and, in turn, communicate with PCRF 116 to obtain the multicast group identifiers associated with the multicast groups of UE 102 (step 722 of FIG. 7B). Again, the multicast group identifiers may be obtained according to UE identifier or IMSI. PGW 114 may return the multicast group identifiers of UE 102 to SGW 106 (step 724 of FIG. 7B) which, in turn, returns the multicast group identifiers of UE 102 to MME 108 (step 726 of FIG. 7B).

Continuing the method in the call flow diagram 700C of FIG. 7C, MME 108 has now obtained the plurality of multicast group identifiers of the plurality of multicast groups associated with UE 102. Now, MME 108 may perform a procedure for establishing a plurality of bearers/tunnels for the plurality of multicast groups (e.g. a single downlink tunnel per multicast group) (procedure 728 of FIG. 7C). In procedure 728, steps 730, 731, 732, and 733 of FIG. 7C may be repeated for each one of the multicast group identifiers associated with the multicast groups of UE 102. In procedure 728, MME 108 may send to SGW 106 a message indicating a create session request (step 730 of FIG. 7C). The message may include the multicast group identifier of one of the multicast groups. SGW 106 may receive this message and, in turn, send to PGW 114 a corresponding message indicating a corresponding create session request (step 731 of FIG. 7C). The message to PGW 114 may include a downlink tunnel endpoint identifier associated with SGW 106 for a downlink tunnel between PGW 114 and SGW 106. PGW 114 may receive this message and create a stored mapping between the multicast group identifier and the downlink tunnel endpoint identifier for the downlink tunnel. In addition, PGW 114 may send to SGW 106 a message indicating a create session response (step 732 of FIG. 7C). The message to SGW 106 may include an uplink tunnel endpoint identifier associated with PGW 114 for an uplink tunnel between SGW 106 and PGW 114. SGW 106 may receive this message and create a stored mapping between the multicast group identifier and the uplink tunnel endpoint identifier for the uplink tunnel. In addition, SGW 106 may send to MME 108 a corresponding message indicating a corresponding create session response (step 733 of FIG. 7C). The message to MME 108 may include an uplink tunnel endpoint identifier associated with SGW 106 for an uplink tunnel to be (subsequently) created between eNB 104 and SGW 106. In FIG. 7C, a tunnel endpoint identifier is indicated as a "TID."

Upon completion of procedure 728, a plurality of downlink tunnels are created between PGW 114 and SGW 106, and a plurality of stored mappings between the plurality of multicast group identifiers and a plurality of downlink tunnel endpoint identifiers associated with the plurality of downlink tunnels are created at PGW 114. In addition, a plurality of uplink tunnels are created between SGW 106 and PGW 114. Further, MME 108 has received (from SGW 106) and stored a plurality of uplink tunnel endpoint identifiers associated with the plurality multicast groups a plurality of uplink tunnels to be (subsequently) created between eNB 104 and SGW 106.

Note that the above description of the procedure 728 assumes that none of the bearers/tunnels was previously established for any of the multicast groups. However, any previously created bearer/tunnel for a multicast group (e.g. from a previously-registered UE) will result in steps 730, 731, 732, 733 being skipped or not being performed (e.g. where MME 108 may consult a stored list of one or more multicast group identifiers indicating associated bearers/tunnels that have already been established for multicast groups).

After completion of procedure 728 and the plurality of bearers/tunnels have been established, MME 108 may send one or more messages to eNB 104 indicating an initial context setup request (step 734 of FIG. 7C). The one or more messages may include a list of mappings between the plurality of multicast groups and the plurality of uplink tunnel endpoint identifiers previously received by MME 108 (as a result of repeated step 733 above). In response to the initial context setup request, the eNB 104 may send to UE 102 a message indicating an attach accept (step 736 of FIG. 7C). In addition, the eNB 104 may perform a procedure for establishing a plurality of bearers/tunnels for the plurality of multicast groups (e.g. a single downlink tunnel per multicast group) (procedure 738 of FIG. 7C).

In procedure 738, steps 740 and 742 of FIG. 7C may be repeated for each one of the multicast group identifiers associated with the multicast groups of UE 102. Using the received list of mappings, eNB 104 may create, for each multicast group, a stored mapping between a multicast group identifier and a respective one of the uplink tunnel endpoint identifiers, to thereby create a plurality of stored mappings between the plurality of multicast group identifiers and the plurality of uplink tunnel endpoint identifiers (step 740 of FIG. 7C). The eNB 104 may further create, for each multicast group, stored mappings between the plurality of multicast group identifiers and a plurality of sets of UE identifiers, each of which identify one or more UEs associated with a multicast group (step 742 of FIG. 7C). Upon completion of procedure 738, eNB 104 may then send to MME 108 one or more messages indicating an initial context setup response (step 744 of FIG. 7C). The one or more messages may include a list of mappings between the plurality of multicast groups and a plurality of downlink tunnel endpoint identifiers associated with eNB 104 for downlink tunnels to be (subsequently) created between eNB 104 and SGW 106.

Continuing the method in the call flow diagram 700D of FIG. 7D, MME 108 may proceed to perform a procedure for modifying the bearer associated with communications for UE 102. Here, MME 108 may send to SGW 106 a message indicating a modify bearer request (step 746 of FIG. 7D). SGW 106 may receive this message and, in turn, send to PGW 114 a corresponding message indicating a corresponding modify bearer request (step 747 of FIG. 7D). PGW 114 may receive and process this message, and send to SGW 106 a message indicating a modify bearer response (step 748 of FIG. 7D). SGW 106 may receive this message and, in turn, send to MME 108 a corresponding message indicating a corresponding modify bearer response (step 749 of FIG. 7D).

Now, MME 108 may perform a procedure for modifying the plurality of bearers/tunnels for the plurality of multicast groups associated with UE 102 (procedure 750 of FIG. 7D). In procedure 750, steps 752, 753, 754, and 755 of FIG. 7D may be repeated for each one of the multicast group identifiers associated with the multicast groups of UE 102. Recall that, from step 744 of FIG. 7C, MME 108 has a stored list of mappings between the plurality of multicast groups and the plurality of downlink tunnel endpoint identifiers associated with eNB 104 for downlink tunnels to be created between SGW 106 and eNB 104. Initially, MME 108 may send to SGW 106 a message indicating a modify bearer request (step 752 of FIG. 7D). The message may include one of the multicast group identifiers and a corresponding one of the downlink tunnel endpoint identifiers associated with eNB 104. SGW 106 may receive this message and create a stored mapping between the multicast group identifier and the downlink tunnel endpoint identifier for the downlink tunnel. In addition, SGW 106 may send to PGW 114 a corresponding message indicating a corresponding modify bearer request (step 753 of FIG. 7D). PGW 114 may receive this corresponding message and send to SGW 106 a message indicating a modify bearer response (step 754 of FIG. 7D). SGW 106 may receive this message and send to MME 108 a message indicating a create session response (step 755 of FIG. 7D). Tunnels endpoint identifiers of the tunnels between PGW 114 and SGW 106 and between SGW 106 and eNB 104 may be linked or associated at SGW 106, for establishing a perceived "single" seamless tunnel between PGW 114 and eNB 104.

Upon completion of procedure 750, a plurality of (linking or linked) downlink tunnels are created between SGW 106 and eNB 104, i.e. the plurality of bearers for multicast communication are now established (step 756 of FIG. 7D). Note that the above description of the repeated procedure assumes that none of the bearers/tunnels was established for any of the multicast groups. However, any previously created bearer/tunnel for a multicast group (e.g. from a previously-registered UE) will result in steps 752, 753, 754, and 755 being skipped or not being performed (e.g. where MME 108 may consult a stored list of multicast group identifiers indicating associated bearers/tunnels that have already been established for multicast groups).

Figure 8:
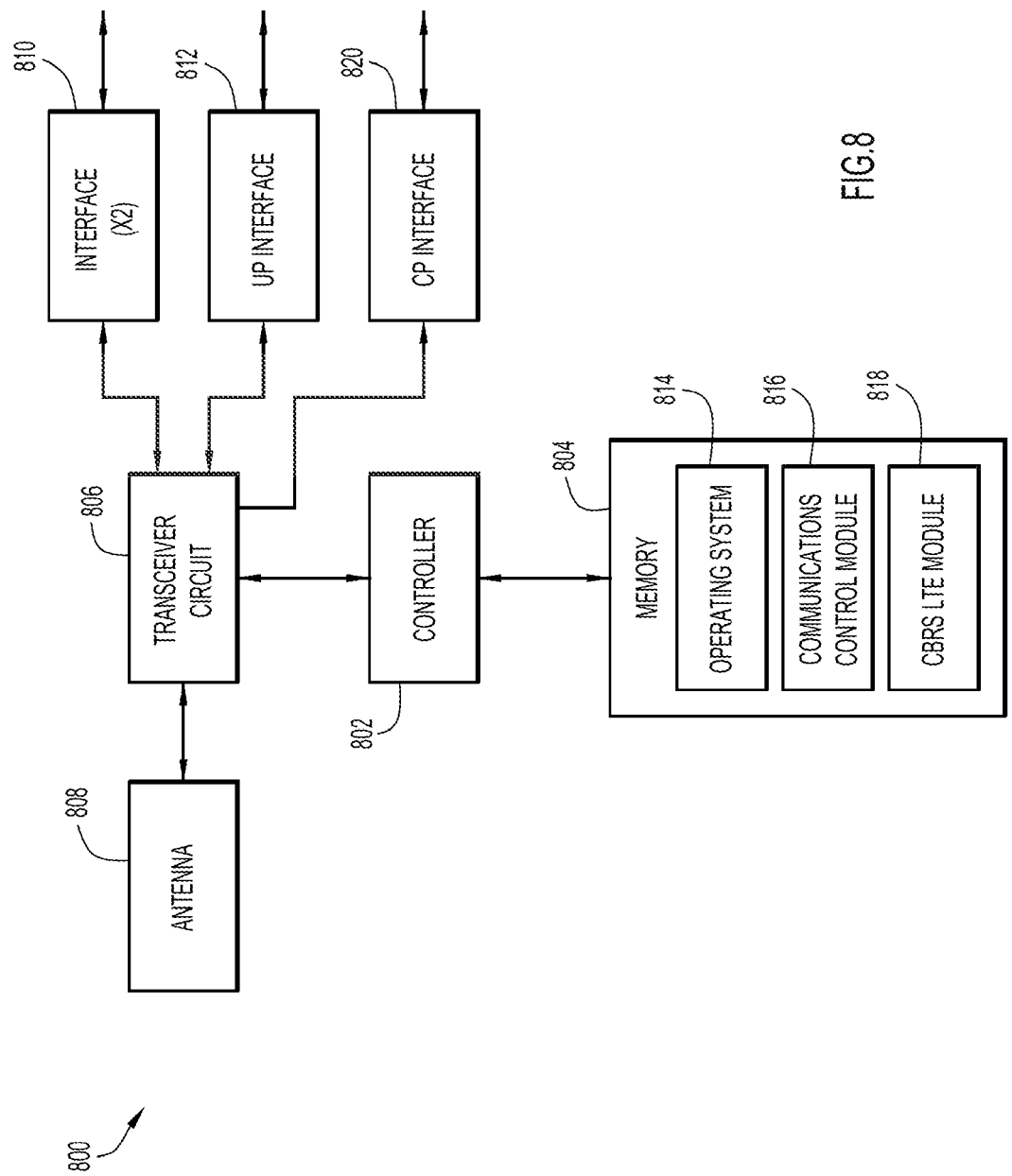
FIG. 8 is a schematic block diagram of relevant components of a RAN entity which is a base station (e.g. an eNodeB or gNodeB) operative according to some implementations of the present disclosure.

Reference is now made to FIG. 8, which shows an example schematic block diagram of components of a RAN entity which is a (CBRS) base station 800 (e.g. an eNB or gNB) or CBSD, according to some implementations. As shown, base station 800 has a transceiver circuit 806 for transmitting signals to and for receiving signals from the communication devices (such as UEs) via one or more antennas 808. Base station 800 may also have an interface 810 (e.g. an X2 interface) for transmitting signals to and for receiving signals from other base stations. Further, base station 800 may have a user plane (UP) interface 812 for transmitting signals to and for receiving signals from a user plane entity (e.g. a serving gateway-user plane or "SGW-U" or user plane function or "UPF", etc.). Even further, base station 800 may have a control plane (CP) interface 820 for transmitting control signaling to and from a control plane function (e.g. a serving gateway-control plane or "SGW-C," etc.).

Base station 800 also has a controller 802 to control the operation of the base station. Controller 802 is associated with a memory 804. Base station 800 may have all the typical functionality of a CBRS base station, and this may be provided by any one or any combination of hardware, software and firmware, as appropriate. Software may be pre-installed in memory 804 and/or may be downloaded via the network or from a removable data storage device, for example. Controller 802 may be configured to control the overall operation of base station 800 by, in this example, program instructions or software instructions stored within memory 804. As shown, these software instructions include, among other things, an operating system 814, a communications control module 816, a CBRS/LTE module 818, and further instructions for use providing the techniques of the present disclosure.

In basic operation, transceiver circuit 806 is configured to provide radio communications with UEs. Communications control module 816 is configured to control the communication between base station 800 and UEs and other network entities that are connected to base station 800. Communications control module 816 also controls the separate flows of downlink user traffic (via associated data radio bearers) and control data to be transmitted to UEs associated with base station 800 including, for example, control data for core network services and/or mobility of UEs. Communications control module 816 may include a multicast communication module operative in accordance with techniques of the present disclosure. The CBRS/LTE module 818 is configured to communicate with compatible devices and network nodes using appropriate CBRS/LTE protocols known in the art.

Figure 9:
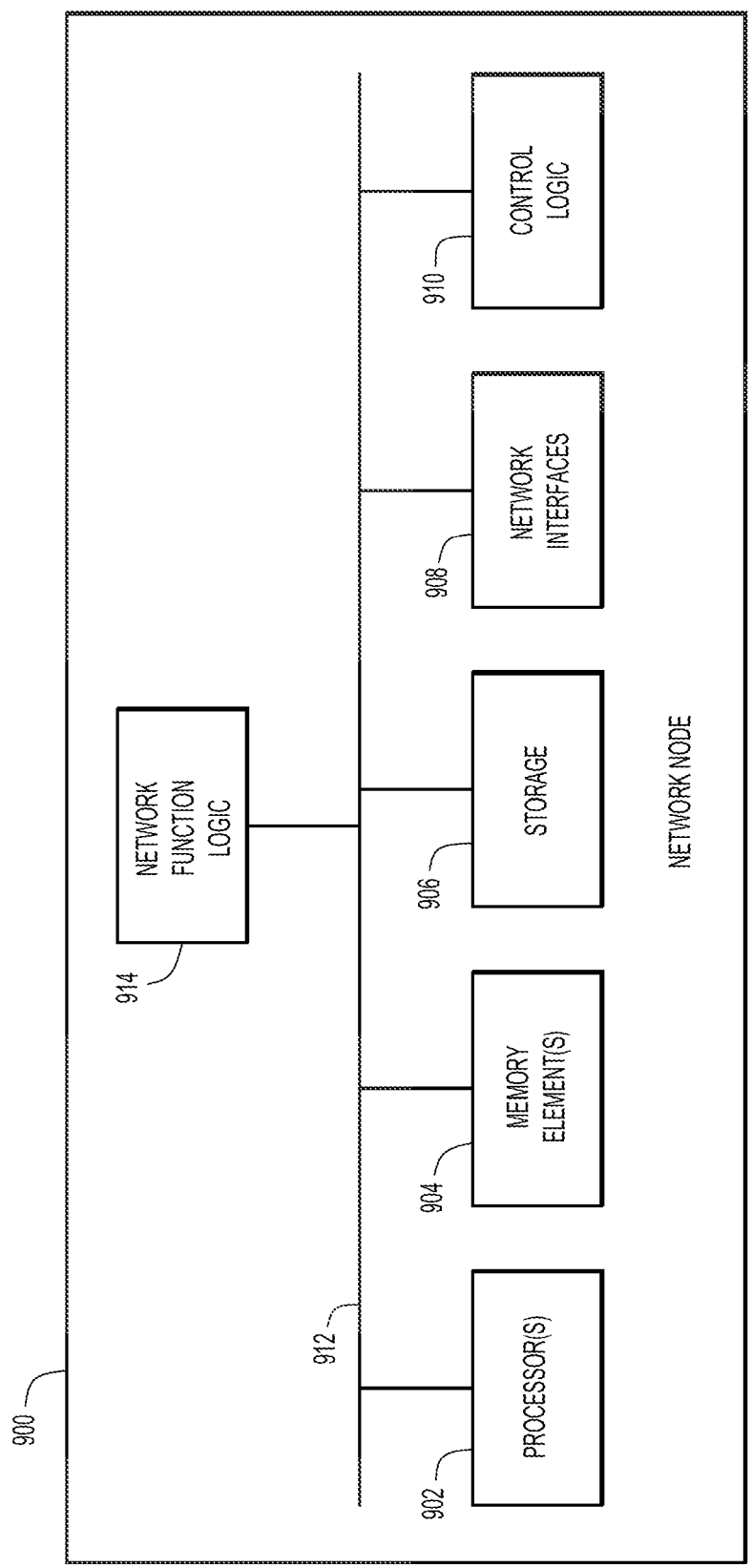
FIG. 9 is a simplified block diagram of a network node which may be or include a controller or network function operative according to some implementations of the present disclosure.

FIG. 9 is a simplified block diagram of a network node 900 which may be a controller or network function according to some implementations of the present disclosure. The control or network function may be or include a control plane entity for mobility management such as an MME or AMF, a user plane entity such as a PGW-U, a gNB, etc. In some implementations, network node 900 may include one or more processors 902, one or more memory elements 904, storage 906, network interfaces 908, control logic 910 and network function logic 914.

In some implementations, the processors 902 may be or include at least one hardware processor configured to execute various tasks, operations and/or functions for network node 900 as described herein according to software and/or instructions configured for the network node 900. In some implementations, memory elements 904 and/or storage 906 are configured to store data, information, software, instructions, logic (e.g. any logic 910 and/or 914), data structures, combinations thereof, or the like for various embodiments described herein. Note that in some implementations, storage may be consolidated with memory elements (or vice versa), or may overlap/exist in any other suitable manner.

In some implementations, network interfaces 908 enable communication between for network node 900 and other network elements, systems, slices, etc. that may be present in the system to facilitate operations as discussed for various embodiments described herein. In some implementations, network interfaces 908 may include one or more Ethernet drivers and/or controllers, Fiber Channel drivers, and/or controllers, or other similar network interface drivers and/or controllers to enable communications for network node 900 within the system.

In some implementations, control logic 910 may include instructions that, when executed (e.g. via processors 902), cause for network node 900 to perform operations, which may include, but not be limited to, providing overall control operations of network node 900; cooperating with other logic, data structures, etc. provisioned for and/or maintained by network node 900; combinations thereof; or the like to facilitate various operations as discussed for various embodiments described herein.

In some implementations, bus 912 may be configured as an interface that enables one or more elements of network node 900 (e.g. processors 902, memory elements 904, logic, etc.) to communicate in order to exchange information and/or data. In at least one embodiment, bus 912 may be implemented as a fast kernel-hosted interconnect, potentially using shared memory between processes (e.g. logic, etc.), which may enable efficient communication paths between the processes. In some implementations, network function logic 914 may include instructions that, when executed (e.g. via one or more processors 902) cause network node 900 to perform one or more operations for one or more network elements as discussed for various implementations described herein. Network function logic 914 may include a multicast communication logic operative in accordance with techniques of the present disclosure.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

Note that the terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

Also note that a system or network may represent a series of points or nodes of interconnected communication paths (wired or wireless) for receiving and transmitting packets of information that propagate through the network. In some implementations, a network may be associated with and/or provided by a single network operator or service provider and/or multiple network operators or service providers. In various embodiments, the network may include and/or overlap with, in whole or in part, one or more packet data network(s) (e.g. one or more packet data networks). A network may offer communicative interfaces between various elements and may be further associated with any LAN, WLAN, metropolitan area network (MAN), wide area network (WAN), virtual private network (VPN), Radio Access Network (RAN), virtual local area network (VLAN), enterprise network, Intranet, extranet, Low Power Wide Area Network (LPWA N), Low Power Network (LPN), Machine to Machine (M2M) network, IoT Network, or any other appropriate architecture or system that facilitates communications in a network environment.

Note that the terms 'UE', 'mobile device,' 'mobile radio device,' 'end device', 'user', 'subscriber' or variations thereof may be used interchangeably and are inclusive of devices used to communicate, such as a computer, an electronic device such as an IoT device (e.g. an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in digital signal processing (DSP) instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory elements and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a field programmable gate array (FPGA), a DSP processor, an EPROM, a controller, an electrically erasable PROM (EEPROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and may accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first tunnel could be termed a second tunnel, and similarly, a second tunnel could be termed a first tunnel, without changing the meaning of the description, so long as all occurrences of the "first tunnel" are renamed consistently and all occurrences of the "second tunnel" are renamed consistently. The first tunnel and the second tunnel are both tunnels, but they are not the same tunnel.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
   at a packet data network gateway user plane (PGW-U) configured to facilitate multicast traffic communication in a Third Generation Partnership Project (3GPP) network,
      operating to maintain a plurality of bearers or sessions which comprise at least a plurality of downlink tunnels between the PGW-U and a serving gateway user plane (SGW-U) towards a radio access network (RAN) entity, the plurality of downlink tunnels being respectively associated with a plurality of downlink tunnel endpoint identifiers of the SGW-U;
      maintaining a plurality of stored mappings between a plurality of multicast group addresses associated with a plurality of multicast groups of a user equipment (UE) and the plurality of downlink tunnel endpoint identifiers of the SGW-U;
      receiving, over an SGi interface from a data network, a user data packet comprising multicast traffic which includes a multicast group address;
      selecting, from the plurality of stored mappings, one of the downlink tunnel endpoint identifiers that is mapped to an identified one of the multicast group addresses that matches the multicast group address from the user data packet comprising the multicast traffic; and
      tunneling the user data packet comprising the multicast traffic in an Internet Protocol (IP) message to the SGW-U towards the RAN entity via one of the downlink tunnels associated with the selected downlink tunnel endpoint identifier, the IP message having a tunnel header including the selected downlink tunnel endpoint identifier and a payload including the user data packet comprising the multicast traffic.

2. The method of claim 1, wherein:
the PGW-U is configured to facilitate the multicast traffic communication in the 3GPP network comprising an enterprise private 3GPP network.

3. The method of claim 1, further comprising:
   at the SGW-U,
      operating to maintain the plurality of bearers or sessions which comprise the plurality of downlink tunnels between the PGW-U and the SGW-U, and further comprise a plurality of linking downlink tunnels between the SGW-U and the RAN entity;
      linking the plurality of downlink tunnel endpoint identifiers of the SGW-U and a plurality of linking downlink tunnel endpoint identifiers of the RAN entity that are associated with the plurality of linking downlink tunnels between the SGW-U and the RAN entity;
      receiving the user data packet comprising the multicast traffic tunneled in the IP message via one of the plurality of downlink tunnels;
      selecting one of the plurality of linking downlink tunnel endpoint identifiers that is linked to an identified one of the downlink tunnel endpoint identifiers that matches the selected downlink tunnel endpoint identifier from the tunnel header of the IP message; and
      tunneling the user data packet comprising the multicast traffic in another IP message to the RAN entity via one of the linking downlink tunnels associated with the selected downlink tunnel endpoint identifier, the another IP message having another tunnel header including the selected linking downlink tunnel endpoint identifier and the payload including the user data packet comprising the multicast traffic.

4. The method of claim 1, further comprising:
   at the PGW-U, participating in establishing the plurality of bearers or sessions which comprise at least the plurality of downlink tunnels in a bearer or session establishment procedure for the UE by:
      receiving, from the SGW-U, a message indicating a request for creating a bearer or session for a multicast group, the message including one of the plurality of multicast group addresses associated with the plurality of multicast groups of the UE;
      creating a stored mapping between the multicast group address and a respective one of the plurality of downlink tunnel endpoint identifiers;
      sending, to the SGW-U, a message indicating a response to the request for creating the bearer or session; and
      repeating, in a loop procedure, the receiving, the creating, and the sending for each multicast group address of the plurality of multicast group addresses associated with the plurality of multicast groups of the UE, for thereby creating the plurality of stored mappings between the multicast group addresses and the downlink tunnel endpoint identifiers.

5. A method comprising:
   at a user plane function (UPF) configured to facilitate multicast traffic communication in a Third Generation Partnership Project (3GPP) network,
      operating to maintain a plurality of bearers or sessions which comprise at least a plurality of downlink tunnels between the UPF and a radio access network (RAN) entity, the plurality of downlink tunnels being respectively associated with a plurality of downlink tunnel endpoint identifiers of the RAN entity;
      maintaining a plurality of stored mappings between a plurality of multicast group addresses associated with a plurality of multicast groups of a user equipment (UE) and the plurality of downlink tunnel endpoint identifiers of the RAN entity;
      receiving, over an N6 interface from a data network, a user data packet comprising multicast traffic which includes a multicast group address;
      selecting, from the plurality of stored mappings, one of the downlink tunnel endpoint identifiers that is mapped to an identified one of the multicast group addresses that matches the multicast group address from the user data packet comprising the multicast traffic; and
      tunneling the user data packet in an Internet Protocol (IP) message to the RAN entity via one of the downlink tunnels associated with the selected downlink tunnel endpoint identifier, the IP message having a tunnel header including the selected downlink tunnel endpoint identifier and a payload including the user data packet comprising the multicast traffic.

6. The method of claim 5, wherein the RAN entity comprises an eNodeB (eNB) or a gNodeB (gNB).

7. The method of claim 5, wherein the plurality of stored mappings comprise a first plurality of stored mappings, the method further comprising:
at the RAN entity,
operating to maintain the plurality of bearers or sessions which comprise the plurality of downlink tunnels between the UPF and the RAN entity;
maintaining a second plurality of stored mappings between the plurality of downlink tunnel endpoint identifiers and the plurality of multicast group addresses, and between the plurality of multicast group addresses and a plurality of sets of UE identifiers each set of which identifies one or more UEs associated with a multicast group;
receiving the user data packet comprising the multicast traffic tunneled in the IP message via one of the plurality of downlink tunnels;
selecting, from the second plurality of stored mappings, one of the multicast group addresses that is mapped to an identified one of the downlink tunnel endpoint identifiers that matches the tunnel endpoint identifier from the tunnel header of the IP message, and one of the sets of UE identifiers that is mapped to the selected multicast group address; and
for each one of at least some of the UE identifiers in the selected set of UE identifiers associated with the selected multicast group identifier:
sending the user data packet from the RAN entity for transmission to the UE associated with the UE identifier.

8. A method comprising:
at a control plane entity for mobility management for use in a Third Generation Partnership Project (3GPP) network,
obtaining a plurality of multicast group identifiers corresponding to a plurality of multicast groups of which a user equipment (UE) is a member;
facilitating establishment of a plurality of bearers or sessions in a bearer or session establishment procedure for the UE, the plurality of bearers or sessions comprising at least a first plurality of downlink tunnels between a packet data network gateway user plane (PGW-U) and a serving gateway user plane (SGW-U) toward a radio access network (RAN) entity, the first plurality of downlink tunnels being respectively associated with a first plurality of downlink tunnel endpoint identifiers of the SGW-U, each bearer or session corresponding to a respective one of the multicast groups for communicating multicast data to members of the multicast group including the UE;
wherein facilitating establishment of the plurality of bearers or sessions in the bearer or session establishment procedure for the UE comprises:
sending to the SGW-U a message indicating a request for creating the bearer or session for a selected multicast group identifier;
receiving from the SGW-U a message indicating a response to the request for creating the bearer or session; and
repeating in a loop procedure the sending and the receiving for each selected one of the plurality of multicast group identifiers of the UE, for creating at the PGW-U a plurality of stored mappings between the plurality of multicast group identifiers and the first plurality of downlink tunnel endpoint identifiers of the SGW-U.

9. The method of claim 8, wherein:
the control plane entity for mobility management comprises a mobility management entity (MME).

10. The method of claim 8, wherein the plurality of stored mappings comprises a first plurality of stored mappings, and wherein facilitating establishment of the plurality of bearers or sessions for the UE in the bearer or session establishment procedure for the UE further includes:
sending to the RAN entity a message indicating a request for an initial context setup which includes a first list of mappings between the plurality of multicast group identifiers and a plurality of uplink tunnel endpoint identifiers of the SGW-U, for creating at the RAN entity a second plurality of stored mappings between the plurality of uplink tunnel endpoint identifiers of the SGW-U and the plurality of multicast group identifiers, and a third plurality of stored mappings between the plurality of multicast group identifiers and a plurality of sets of UE identifiers each set of which identifies one or more UEs associated with a given multicast group; and
receiving from the RAN entity a message indicating a response to the request for the initial context setup which includes a second list of mappings between the plurality of multicast group identifiers and a second plurality of downlink tunnel endpoint identifiers of the RAN entity.

11. The method of claim 10, wherein facilitating establishment of the plurality of bearers or sessions for the UE in the bearer or session establishment procedure for the UE further comprises:
sending to the SGW-U a message indicating a request for modifying the bearer or session which includes a selected multicast group identifier and a mapped one of the second plurality of downlink tunnel endpoint identifiers of the RAN entity;
receiving from the SGW-U a message indicating a response to the request for modifying the bearer or session; and
repeating in another loop procedure the sending and the receiving for each one of the plurality of multicast group identifiers of the UE, for creating at the SGW-U a fourth plurality of stored mappings between the plurality of multicast group identifiers and the second plurality of downlink tunnel endpoint identifiers of the RAN entity.

12. The method of claim 8, wherein obtaining the plurality of multicast group identifiers further comprises:
receiving, from the UE, one or more messages which include the plurality of multicast group identifiers corresponding to the plurality of multicast groups of the UE.

13. The method of claim 8, wherein obtaining the plurality of multicast group identifiers further comprises:
retrieving, from a subscriber database or repository, the plurality of multicast group identifiers stored in association with a UE identifier of the UE.

14. The method of claim 8, wherein obtaining the plurality of multicast group identifiers further comprises:
obtaining, from a policy function, the plurality of multicast group identifiers corresponding to the plurality of multicast groups in the bearer or session establishment procedure for the UE,
wherein the policy function comprises one of a Policy and Charging Rules Function (PCRF) or a Policy Control Function (PCF).

* * * * *